(12) United States Patent
Takeuchi et al.

(10) Patent No.: US 7,601,551 B2
(45) Date of Patent: *Oct. 13, 2009

(54) METHOD FOR MANUFACTURING OPTICAL DEVICE

(75) Inventors: Yukihiro Takeuchi, Nishikamo-gun (JP); Junji Oohara, Nisshin (JP)

(73) Assignee: DENSO CORPORATION, Kariya (JP)

( * ) Notice: Subject to any disclaimer, the term of this patent is extended or adjusted under 35 U.S.C. 154(b) by 294 days.

This patent is subject to a terminal disclaimer.

(21) Appl. No.: 11/489,670

(22) Filed: Jul. 20, 2006

(65) Prior Publication Data

US 2007/0059856 A1 Mar. 15, 2007

(30) Foreign Application Priority Data

Sep. 9, 2005 (JP) ............................. 2005-261578

(51) Int. Cl.
*H01L 21/66* (2006.01)
(52) U.S. Cl. ............................. 438/30; 438/48; 438/50; 438/52
(58) Field of Classification Search .................. 438/30, 438/48, 50, 52, 16, 27, 65
See application file for complete search history.

(56) References Cited

U.S. PATENT DOCUMENTS

| 6,277,756 | B1 | 8/2001 | Ohara et al. |
| 6,630,389 | B2 | 10/2003 | Shibata et al. |
| 6,721,476 | B2 | 4/2004 | Padmanabhan et al. |
| 2003/0123827 | A1 | 7/2003 | Salerno et al. |
| 2004/0173862 | A1 | 9/2004 | Oohara et al. |
| 2007/0069318 | A1* | 3/2007 | Takeuchi et al. ............ 257/432 |

OTHER PUBLICATIONS

Office Action mailed issued on Apr. 21, 2009 from the German Patent Office in the corresponding German patent application No. 10 2006 041 996.0-51 (with English translation).

* cited by examiner

*Primary Examiner*—Chuong A. Luu
(74) *Attorney, Agent, or Firm*—Posz Law Group, PLC

(57) ABSTRACT

A method for manufacturing an optical device having an optical block, through which a light is transmitted, is provided. The method includes steps of: forming a plurality of silicon oxide members, which is disposed on a silicon substrate, wherein the silicon oxide members are arranged in parallel each other by a predetermined clearance between two adjacent silicon oxide members; and pouring a super critical fluid into the clearance so that the clearance is filled with a product formed from a predetermined compound for forming the optical block, wherein the predetermined compound is dissolved in the super critical fluid.

16 Claims, 19 Drawing Sheets

METHOD FOR MANUFACTURING OPTICAL DEVICE

CROSS REFERENCE TO RELATED APPLICATION

This application is based on Japanese Patent Application No. 2005-261578 filed on Sep. 9, 2005, the disclosure of which is incorporated herein by reference.

FIELD OF THE INVENTION

The present invention relates to a method for manufacturing an optical device.

BACKGROUND OF THE INVENTION

The present applicant proposed a manufacturing method of an optical element such as a micro lens, etc. in an earlier application (JP-A-2004-271756, which corresponds to US 2004-0173862-A1). In this manufacturing method, a silicon substrate is trench-etched and many trenches are arranged in parallel. A silicon oxide is buried within each trench by thermal oxidation. The micro lens integrated with the silicon substrate is made by replacing a silicon layer between the respective trenches with the silicon oxide.

The following contents have been found by subsequent consideration. Each trench is formed by using an etching mask patterned on the basis of a resist mask and processing the silicon substrate by D-RIE (Deep Reactive Ion Etching). The width of the trench is dispersed by dispersions respectively caused in resist mask making, etching mask making and trench processing. Therefore, it has been found that there is a fear that no trench interior can be buried by the silicon oxide by the thermal oxidation without any clearance.

For example, when the resist mask is made by semiconductor photolithography, a dispersion of about 0.2 μm is generated with respect to a groove width of 2 μm. Further, when the etching mask is made, the width of the groove corresponding to the trench is dispersed by, e.g., 0.1 to 0.2 μm. Further, when the trench is processed by using the etching mask, the width of the trench is dispersed by, e.g., 0.1 to 0.2 μm.

When a clearance is left within the trench by such dispersions at the processing time, a diffraction phenomenon is generated and diffraction light is advanced in a direction different from an original converging and refracting direction. Therefore, there is a fear that efficiency is reduced.

In a method using a liquid phase represented by the sol-gel method, it is difficult to invade a liquid into the trench of a high aspect ratio since viscosity of the liquid is high. Further, in a gaseous phase method represented by CVD, the trench can be buried, but a film forming speed must be greatly reduced. Further, in a physical film forming method represented by sputtering and evaporation, a sidewall within the trench becomes shade. Therefore, it is difficult to bury the trench completely.

In particular, when each of the above methods is applied to the trench of a high aspect ratio larger than ten, a problem exists in that an opening portion of the trench is early narrowed and a clearance is left within the trench. FIG. 27 is a schematic view showing a state in which the clearance is left within the trench. A silicon oxide film 32 is formed on an inner wall face of the trench 31 formed in the silicon substrate 30. However, the opening portion is narrowed by the silicon oxide film 32, and it becomes difficult to supply the silicon oxide into the trench 31, and the clearance 33 is left within the trench 31.

As mentioned above, it has been found that there is a fear that the clearance is left within the trench.

SUMMARY OF THE INVENTION

In view of the above-described problem, it is an object of the present disclosure to provide a manufacturing method of an optical device without a clearance therein.

According to a first aspect of the present disclosure, a method for manufacturing an optical device having an optical block, through which a light is transmitted, is provided. The method includes steps of: forming a plurality of silicon oxide members, which is disposed on a silicon substrate, wherein the silicon oxide members are arranged in parallel each other by a predetermined clearance between two adjacent silicon oxide members; and pouring a super critical fluid into the clearance so that the clearance is filled with a product formed from a predetermined compound for forming the optical block, wherein the predetermined compound is dissolved in the super critical fluid.

In the above case, it is possible to form the block in which each clearance is buried by the above product from the predetermined chemical compound without any clearance. Thus, it is possible to manufacture an optical element having no fear that a diffraction phenomenon due to the clearance is generated and efficiency is reduced. Further, each clearance can be buried by the product from the predetermined chemical compound for a short time in comparison with the gaseous phase method. Thus, a manufacturing time is shortened.

According to a second aspect of the present disclosure, a method for manufacturing an optical device having an optical block, through which a light is transmitted, is provided. The method includes steps of: forming a plurality of silicon oxide members, which is disposed in a silicon substrate, wherein the silicon oxide members are arranged in parallel each other by a predetermined clearance between two adjacent silicon oxide members; pouring a super critical fluid into the clearance so that the clearance is filled with a product formed from a predetermined compound, wherein the predetermined compound is dissolved in the super critical fluid; and removing a periphery portion of the silicon substrate disposed around the silicon oxide members with the compound filled in the clearance so that the optical block is formed.

In the above case, it is possible to form the block in which each clearance is buried by the above product from the predetermined chemical compound without any clearance. Thus, it is possible to manufacture an optical element having no fear that a diffraction phenomenon due to the clearance is generated and efficiency is reduced. Further, each clearance can be buried by the product from the predetermined chemical compound for a short time in comparison with the gaseous phase method. Thus, a manufacturing time is shortened.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment Mode

Figure 1:
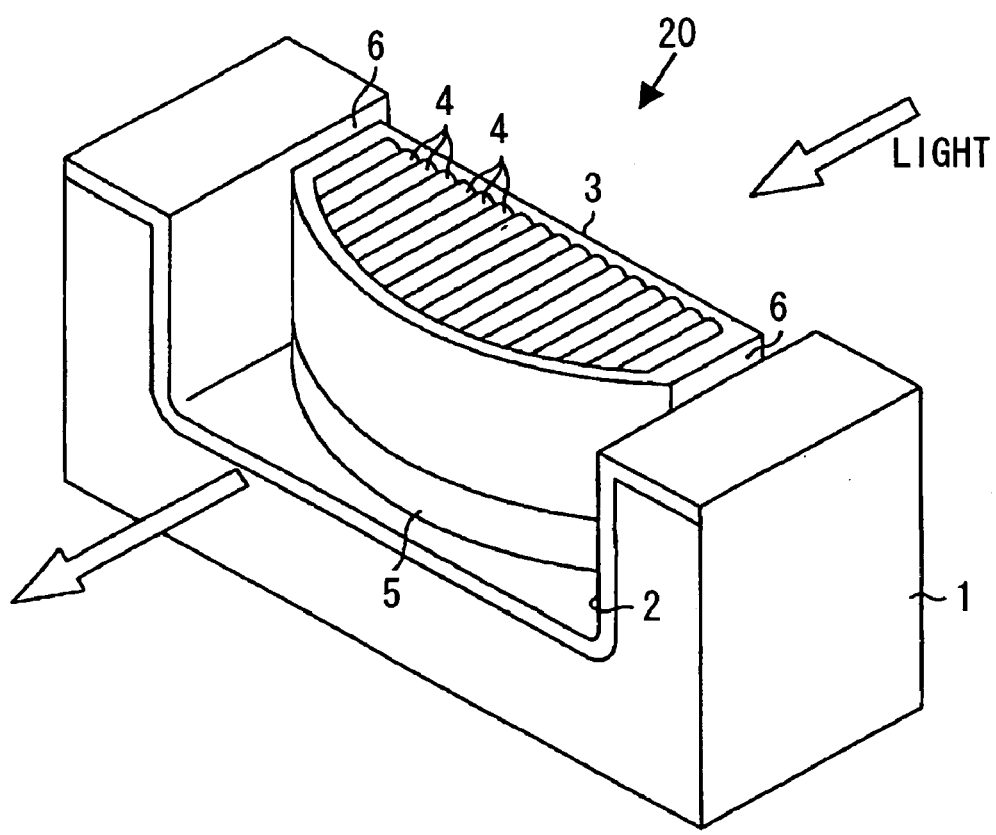
FIG. 1 is a perspective view showing an optical device according to a first embodiment mode.
Figure 2A:
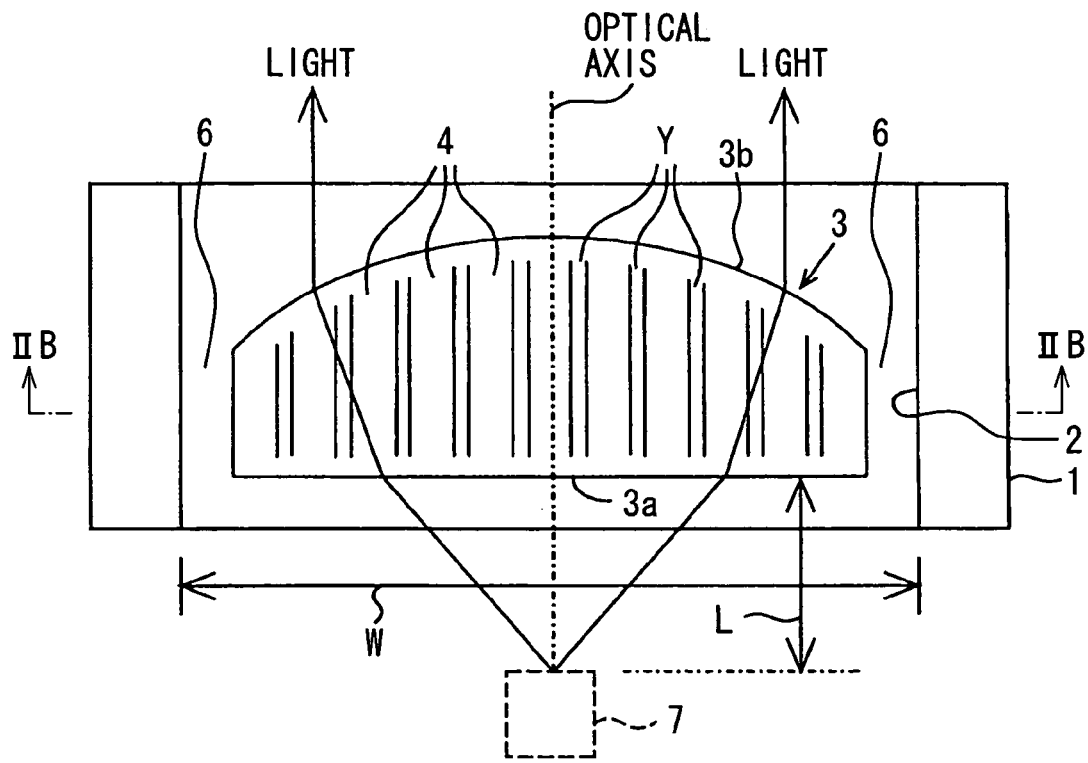
FIG. 2A is a top view showing the optical device.
Figure 2B:
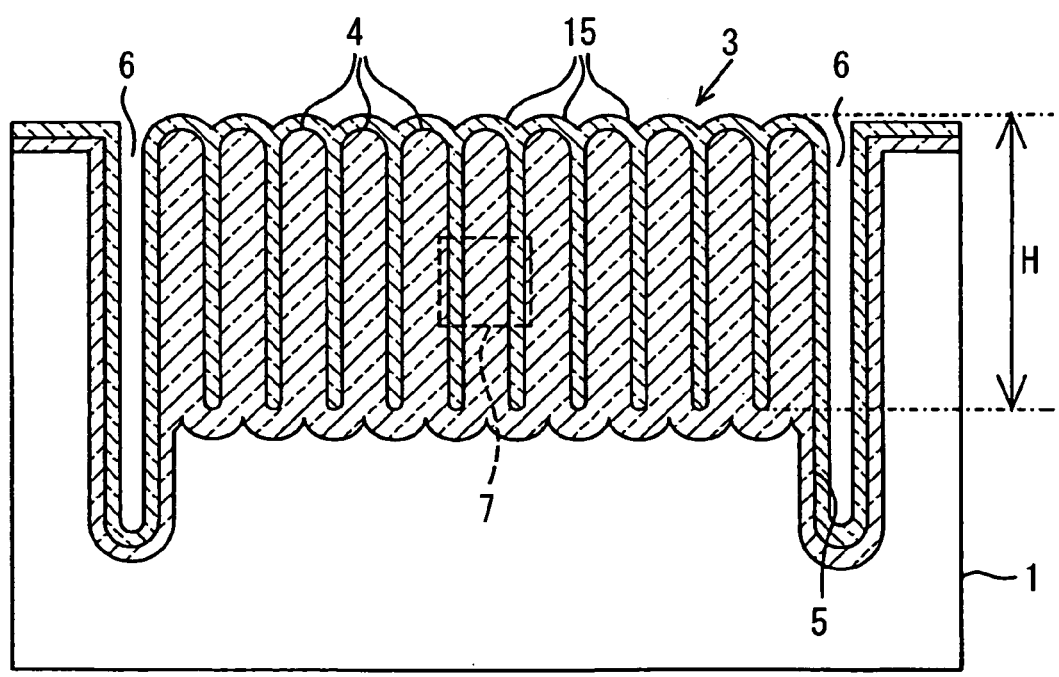
FIG. 2B is a cross sectional view showing the device taken along line IIB-IIB in FIG. 1.

A manufacturing method of an optical element in accordance with an embodiment mode of this invention will be explained with reference to the drawings. In this embodiment mode, an optical element having a micro lens will be typically explained as the optical element. FIG. 1 is a perspective view of the optical element manufactured by the manufacturing method of the optical element in accordance with this embodiment mode. FIGS. 2A and 2B are explanatory views of the optical element shown in FIG. 1, where FIG. 2A shows a plan view of the optical element shown in FIG. 1, and FIG. 2B shows a cross-sectional view seen from line IIB-IIB of FIG. 1.

[Main Structure of Optical Element]

The optical element 20 of this embodiment mode is constructed by arranging a micro lens 3 on an internal bottom face of a concave portion 2 formed in a silicon substrate 1. As shown in FIGS. 2A and 2B, in this embodiment mode, the micro lens 3 is a cylindrical lens of a flat convex type having a flat incident face 3a and an emitting face 3b constructed by a convex face. The plane azimuth of a substrate face of the silicon substrate 1 is set to a (110)-surface orientation.

Plural thin columnar structural bodies 4 of a thin plate shape constructed by a silicon oxide (i.e., $SiO_2$) are arranged so as to rise in an adjacent state from the internal bottom face of the concave portion 2 of the silicon substrate 1. A burying layer 15 formed by a silicon oxide is buried between the respective columnar structural bodies 4 without a clearance. The columnar structural body 4 and the burying layer 15 are formed integrally with the silicon substrate 1. Namely, the micro lens 3 is constructed by a silicon oxide block formed by the plural columnar structural bodies 4 and the plural burying layers 15.

As shown in FIGS. 2A and 2B, each lower face of each columnar structural body 4 and the burying layer 15 is set to an arc face swollen downward on the lower face. The silicon oxide block (micro lens 3) is connected to the silicon substrate 1 on a boundary face of a micro irregular shape without interposing an adhesive. Namely, the silicon oxide block (micro lens 3) is arranged so as to rise in a state in which the lower face as the boundary face with respect to the silicon substrate 1 has an irregular shape continued in the horizontal direction from the internal bottom face of the concave portion 2 of the silicon substrate 1. Light is structurally transmitted to the silicon oxide block (micro lens 3) formed integrally with this silicon substrate 1.

Further, as shown in FIGS. 2A and 2B, the plural columnar structural bodies 4 constructed by the silicon oxide are extended in parallel with an optical axis on the internal bottom face of the concave portion 2 of the silicon substrate 1. Thus, the extending direction of the columnar structural body 4 becomes parallel to a passing direction of light, and an angle formed between this extending direction and the passing direction of light can be set to an angle within a total reflection angle between the silicon oxide and an air layer. Thus, it is possible to restrain that the transmission of light due to scattering of light, etc. is reduced. The micro lens 3 as the silicon oxide block formed integrally with the silicon substrate 1 has a connecting portion (pedestal portion) 5 constructed by the silicon substrate 1 of the same shape as the silicon oxide block below the micro lens 3. Further, the micro lens 3 (silicon oxide block) formed integrally with the silicon substrate 1 within the concave portion 2 is arranged in an existing state of an air gap 6 in its circumference. Thus, the silicon oxide block and the silicon substrate outside this silicon oxide block can be perfectly separated, and buckling can be avoided at a manufacturing time (described later in detail). In this embodiment mode, as shown in FIGS. 2A and 2B, the micro lens 3 (silicon oxide block) has 10 μm or more in thickness of the vertical direction (height H), concretely, about 100 μm. Further, the width W of the horizontal direction of the micro lens 3 is about 500 μm.

Figure 10:
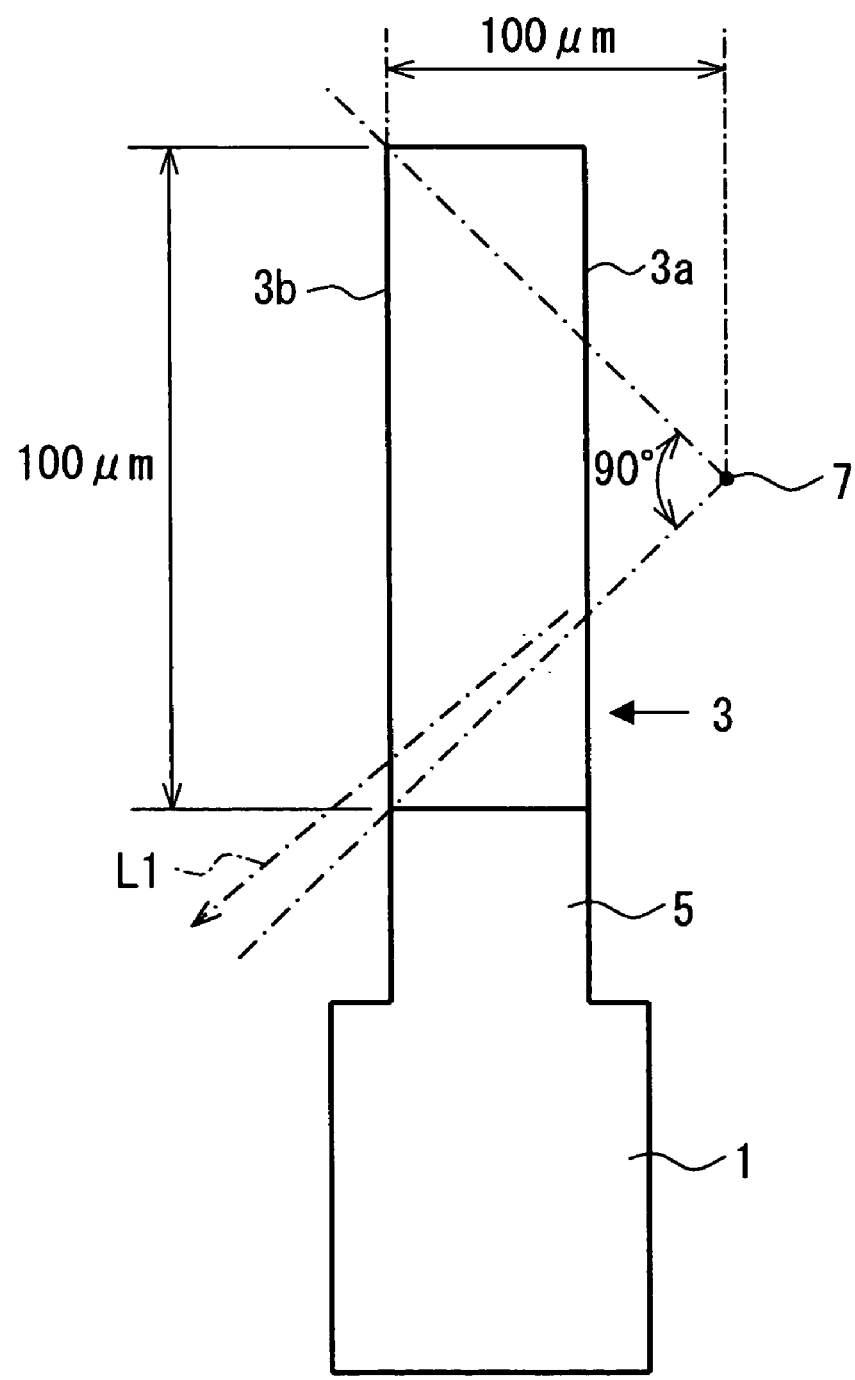
FIG. 10 is a vertical cross sectional view showing the optical device.

This micro lens 3 has excellent radiating characteristics to take a structure connected to the silicon substrate 1 without interposing an adhesive layer. For example, when a case used for collimation of a high output laser 7 is supposed, the size of the micro lens 3 is small. Therefore, as shown in FIG. 10 as a longitudinal sectional view of the optical element 20, when a widening angle of the laser is set to 90°, the distance L (see FIGS. 2A and 2B) between a light emitting end of the high output laser 7 and the lens 3 is set to about 100 μm. Namely, the emitting face 3b of the lens is arranged in proximity with the light emitting end of the high output laser 7 until about 100 μm. In this case, there is a fear that temperature of the micro lens itself rises by absorbing heat of a laser beam. However, this micro lens 3 is connected to the silicon substrate 1 of a very high thermal conductive property in comparison with glass. Therefore, since the heat is escaped on the silicon substrate 1 side, there is a merit in that temperature of the micro lens does not easily rise.

[Manufacturing Method of Optical Element]

The manufacturing method of the optical element 20 of the above structure will next be explained.

Figure 3:
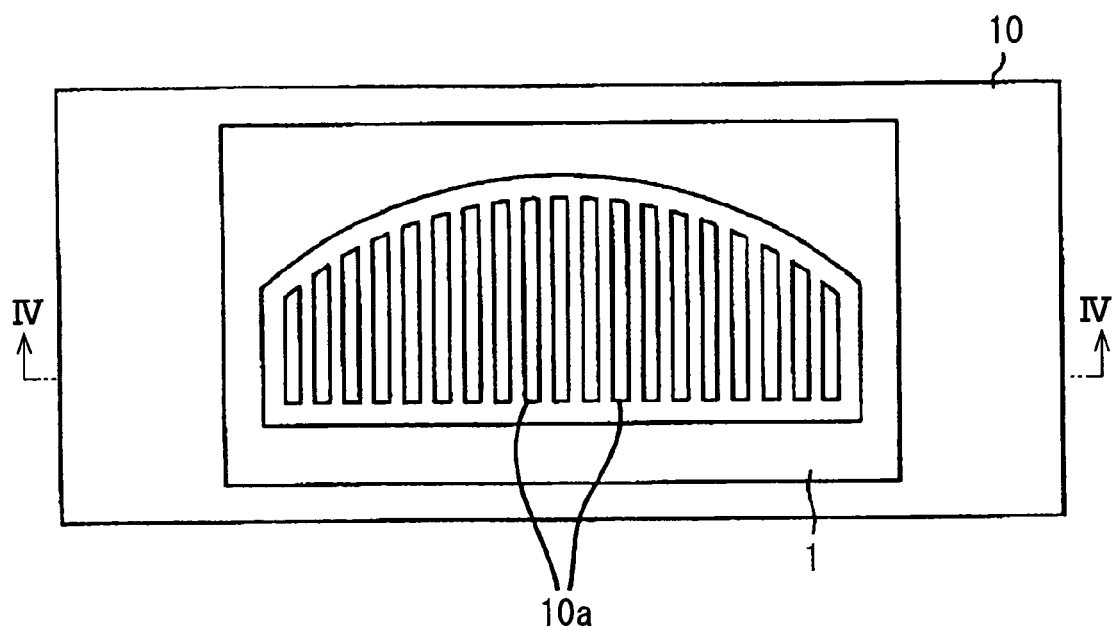
FIG. 3 is a plan view showing an oxide mask on a silicon substrate to explain a method for manufacturing the optical device according to the first embodiment mode.
Figure 4:
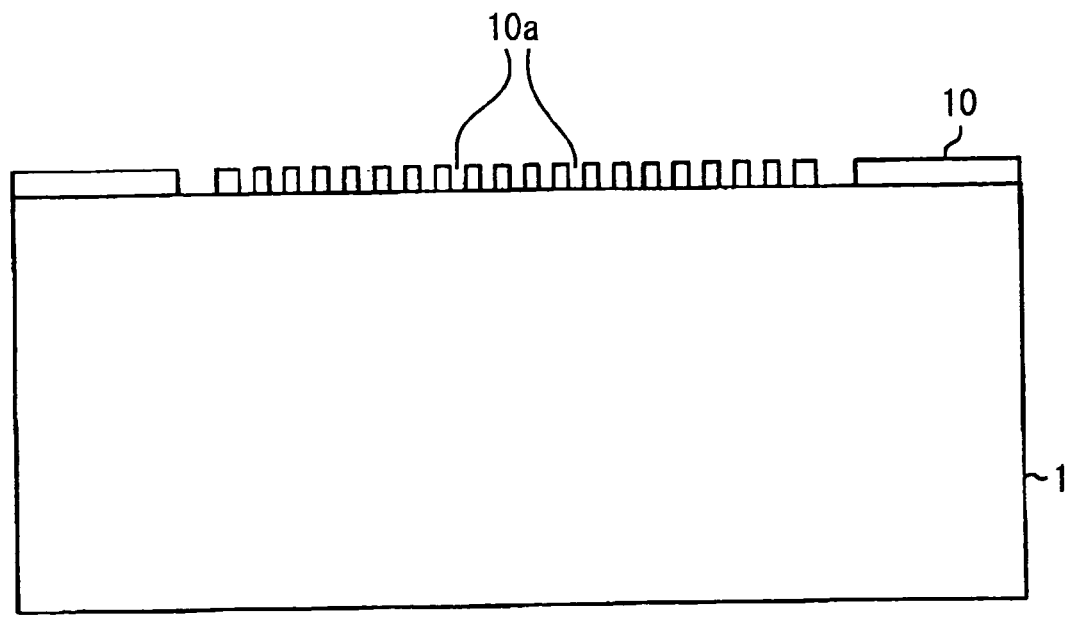
FIG. 4 is a cross sectional view showing the optical device taken along line IV-IV in FIG. 3.
Figure 5:
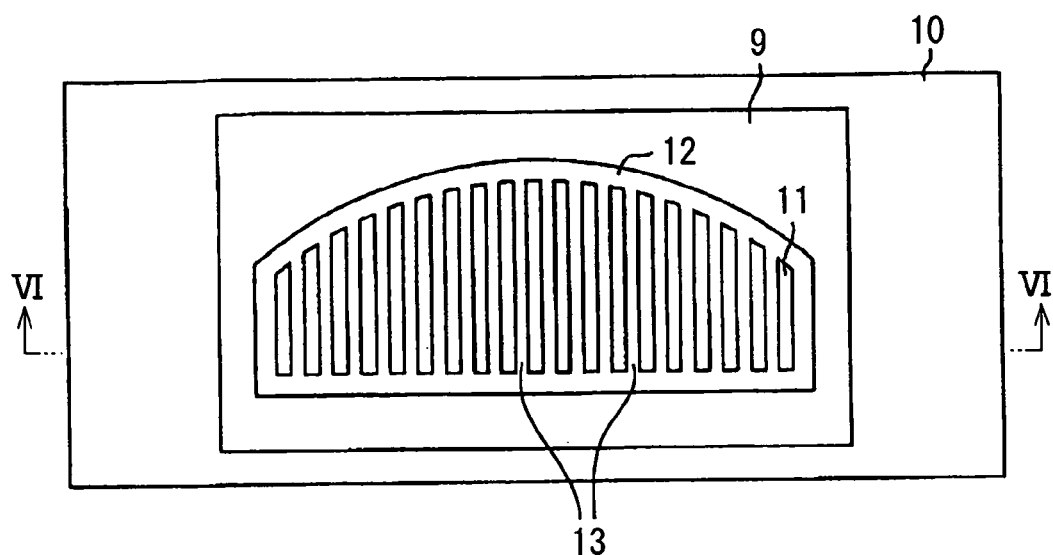
FIG. 5 is a plan view showing a step of forming a trench in the method for manufacturing the optical device according to the first embodiment mode.
Figure 6:
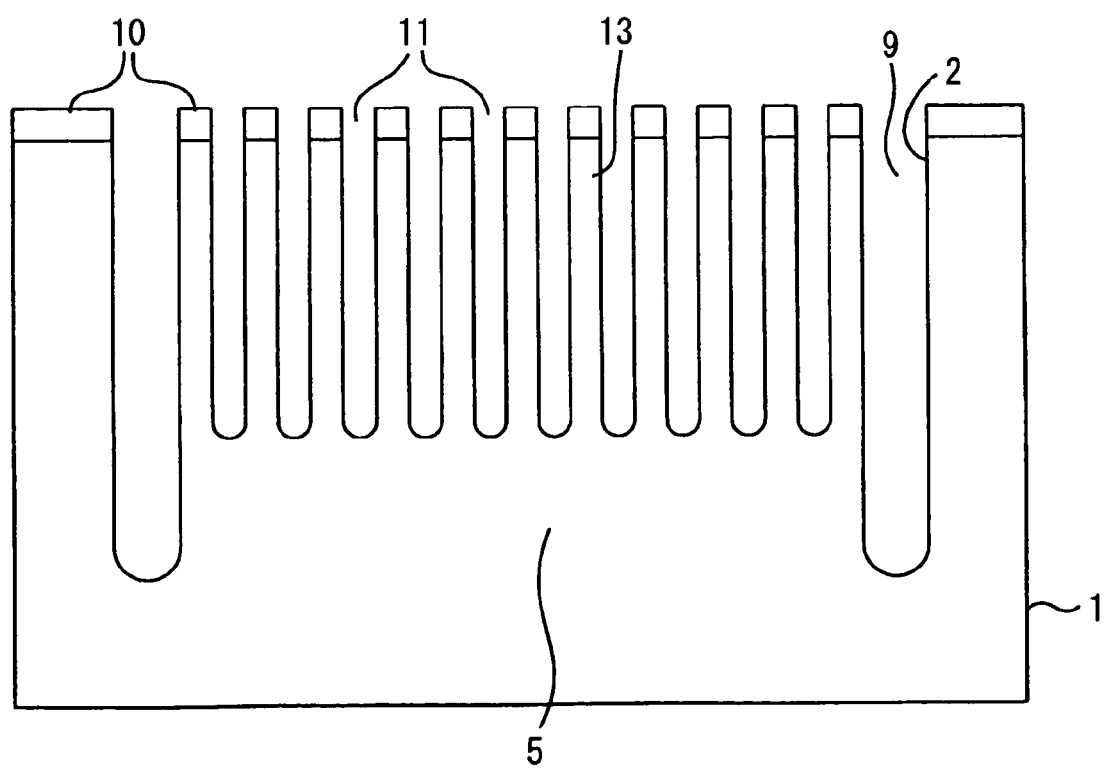
FIG. 6 is a cross sectional view showing the optical device taken along line VI-VI in FIG. 5.
Figure 7:
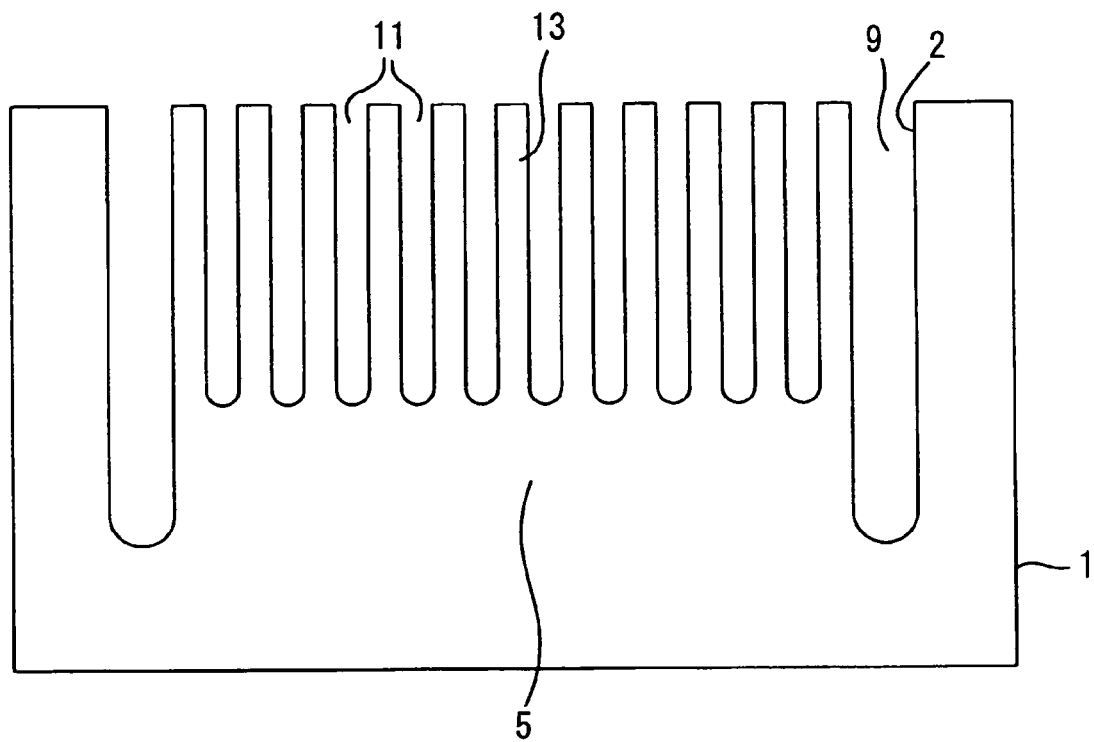
FIG. 7 is a cross sectional view showing a step of removing the oxide mask in the method for manufacturing the optical device according to the first embodiment mode.
Figure 8:
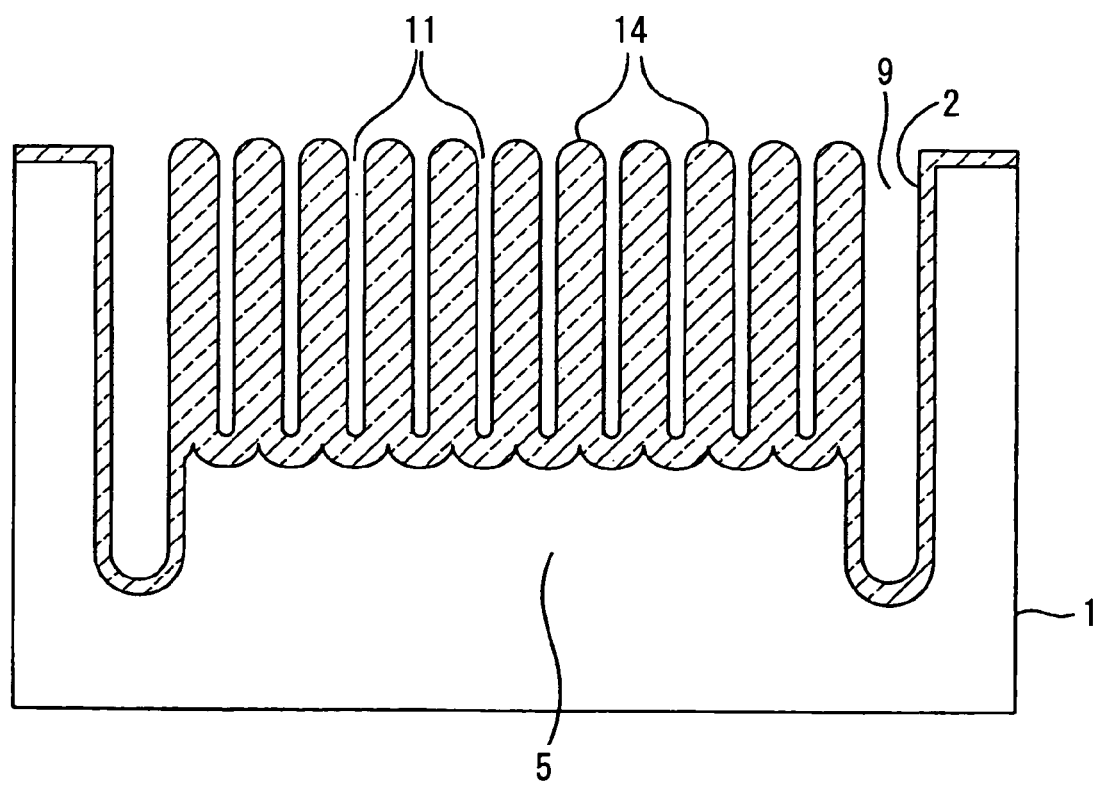
FIG. 8 is a cross sectional view showing a step of thermally oxidizing in the method for manufacturing the optical device according to the first embodiment mode.
Figure 9:
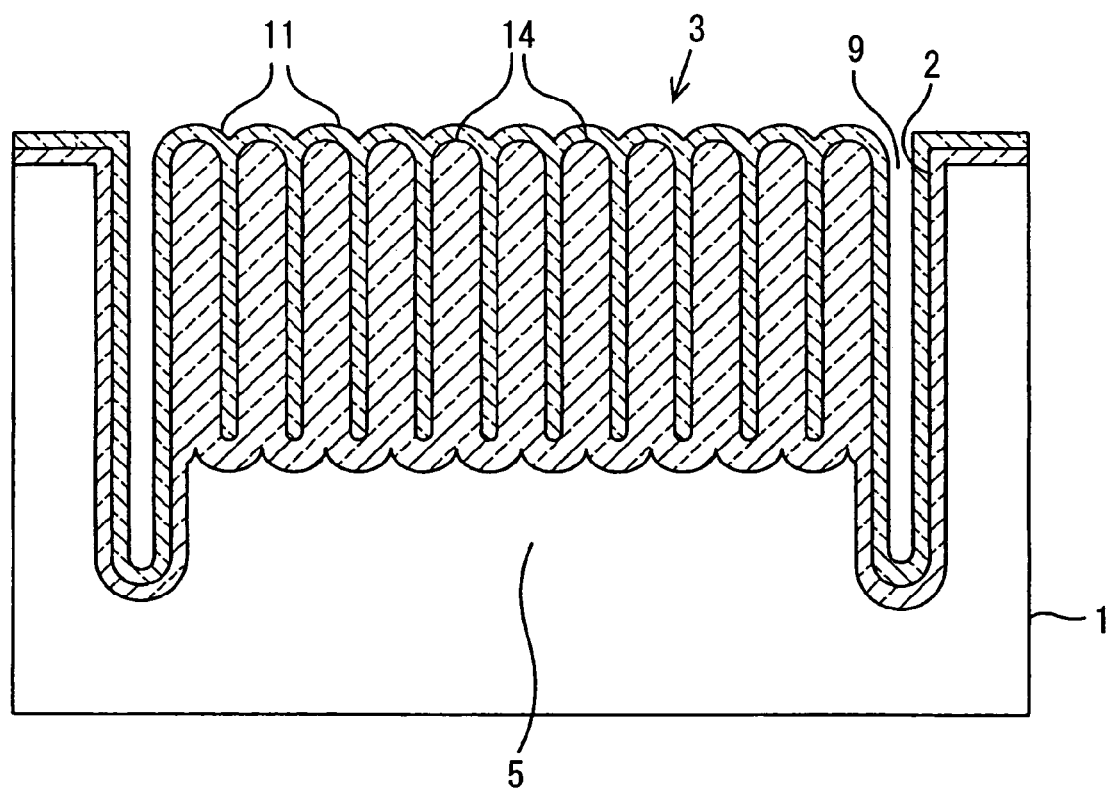
FIG. 9 is a cross sectional view showing a step of embedding the trench with a silicon oxide in the method for manufacturing the optical device according to the first embodiment mode.

FIG. 3 is a plan view showing a state in which an oxide film mask is arranged on the substrate face of the silicon substrate. FIG. 4 is a cross-sectional view seen from line IV-IV of FIG. 3. FIG. 5 is a plan view showing a state in which a trench is formed from the state of FIG. 3. FIG. 6 is a cross-sectional view seen from line VI-VI of FIG. 5. FIG. 7 is a cross-sectional view showing a state in which an oxide film mask is removed from the state of FIG. 6. FIG. 8 is a cross-sectional view showing a state in which thermal oxidation is performed from the state of FIG. 7. FIG. 9 is a cross-sectional view showing a state in which the trench is buried by a silicon substrate.

<Formation of Trench>

First, as shown in FIGS. 3 and 4, a micro lens shape is patterned by using an oxide film mask 10 on the substrate face of the silicon substrate 1. Plural opening portions 10a each corresponding to the shape of the trench formed in the next etching process are formed in the oxide film mask 10.

As shown in FIGS. 5 and 6, etching is performed from each opening portion 10a of the oxide film mask 10 so that the trench 11 is formed. Namely, the silicon substrate 1 is trench-etched from the substrate face by using the patterned oxide film mask 10 so that many trenches 11 of a constant width are arranged in parallel at a constant interval. For example, reactive ion etching is used as an etching technique. Then, the trench of a high aspect ratio (e.g., aspect ratio of 60) is formed by alternately repeating an etching step for etching the silicon substrate 1 by plasma of an etching property gas, and a protecting film forming step for forming a sidewall protecting film within the trench by plasma of a depositing property gas while the etching gas step and the protecting film forming step are switched.

When the trench etching shown in FIGS. 5 and 6 is performed, it is necessary to form the trench of a high aspect ratio (depth/width) so as to obtain a three-dimensional lens shape by forming a deeper trench 11 with respect to a prescribed trench width (hereinafter called a pulling width).

Therefore, a protecting oxide film is formed on an inner face (a side face and a bottom face) of the formed trench 11 by utilizing the etching technique of JP-A-2000-299310, which corresponds to U.S. Pat. No. 6,277,756, and the oxide film of the bottom face is removed by the reactive ion etching, and the silicon substrate 1 is subsequently etched from this bottom face. The forming process of the protecting oxide film and the etching process of the trench bottom portion are repeatedly performed in this way. Thus, a trench very perpendicular in a sectional profile is obtained until an aspect ratio of about "60". Thus, in the trench etching, the trench 11 is formed by the reactive ion etching, and an oxide film for protection is formed in this trench inner wall. Further, after the oxide film for protection in the trench bottom portion is etched, the trench is further deepened by the reactive ion etching from the bottom portion of the trench 11. Thus, the trench of a high aspect ratio can be formed.

Figure 14A:
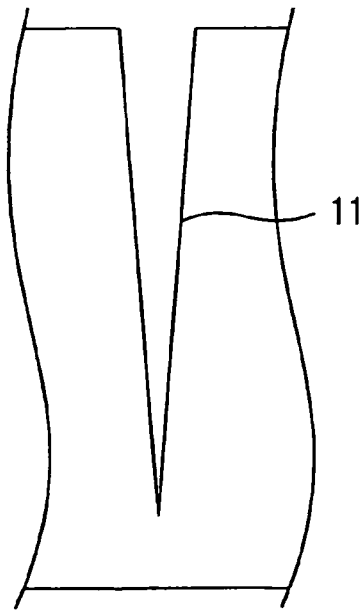
FIGS. 14A and 14B are cross sectional views showing trenches formed in methods for manufacturing an optical device according to modifications of the first embodiment mode.
Figure 14B:
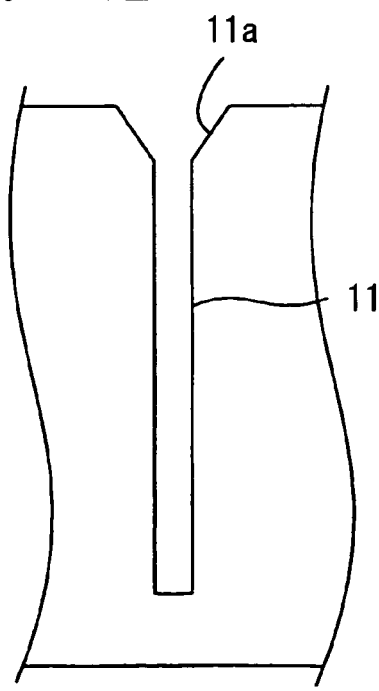

FIGS. 14A and 14B are explanatory views showing modified examples of the trench. As shown in FIG. 14A, the trench 11 of a sequential taper shape narrowed in width as it is deepened may be also formed. The trench 11 may be also formed as shown in FIG. 14B. This trench 11 has a wide portion 11a formed at the same width from the bottom portion until an intermediate portion toward the upper portion, and gradually widened in width from this intermediate portion. An uppermost portion of the trench 11 is widest. For example, a portion of the taper shape can be made by controlling the oxide film for protection so as to be thickly left.

In FIGS. 5 and 6, many trenches 11 of a constant width are arranged in parallel at a constant interval by the trench etching. However, it is not limited to this arrangement. For example, trenches having no constant width may be also arranged in parallel, and many trenches may be also arranged in parallel at an interval which is not constant.

Further, plural trenches (many trenches arranged in parallel) 11 are extended in parallel with an optical axis in the same direction in a micro lens forming area. A ratio of a pulling width and the width (hereinafter called the remaining width) of a silicon layer 13 as a wall between the trenches is set such that a clearance is left between the respective silicon layers and a state for opening an upper portion of the clearance is attained when each silicon layer 13 is replaced with oxidized silicon in the next thermal oxidizing process. Namely, the trench is set so as not to form a clearance into which super critical fluid cannot be flowed when the subsequent super critical fluid is flowed into the trench.

In FIGS. 5 and 6, in an outermost circumferential portion for prescribing the shape of a block for light transmission, i.e., in an outermost circumference (contour line) of the lens forming area, a trench 9 is formed around a forming area of the block for light transmission so as to be connected by the silicon layer 12 of a predetermined width. Namely, the trench 9 is surrounded by the remaining area (12). The curvatures of an incident face and an emitting face of light are prescribed by a pattern of this contour line (12). Therefore, an arbitrary curved surface is obtained in accordance with a pattern design (an arbitrary face is obtained).

Further, the width of the remaining area as the contour line (12) is set to the same as the remaining width between the trenches 11, or is set to be thinner than this remaining width. Namely, the width of the connected silicon layer 12 is set to the width of the silicon layer between the trenches 11 or less. The reasons for this are as follows.

Figure 11A:
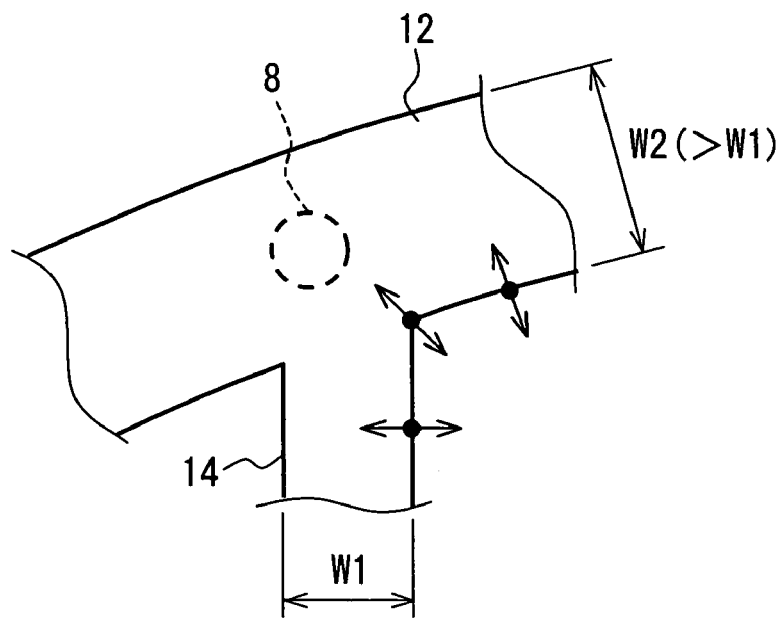
FIGS. 11A and 11B are partially enlarged plan views showing a connection portion between two silicon layers.
Figure 11B:
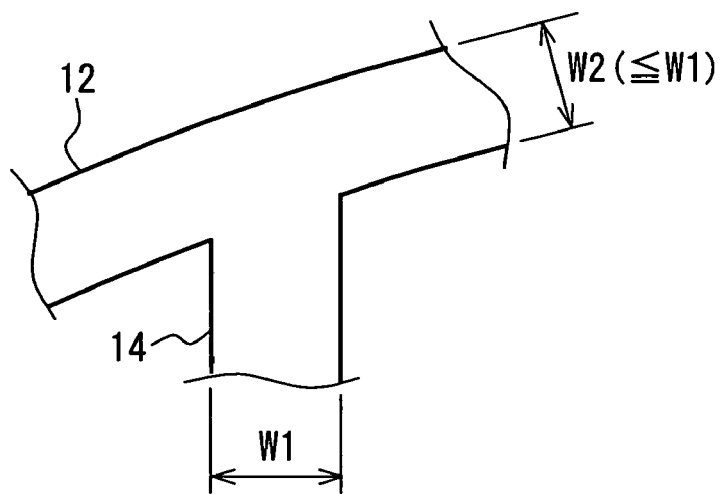

FIGS. 11A and 11B are enlarged explanatory views of connecting portions of the silicon layers 12, 13. As shown in FIG. 11A, the remainder (14) of the lens forming area and the contour line (12) are approximately connected to a T-character type, but an advancing speed of the oxide film of this T-character portion becomes slower than that of the other portions. Therefore, when the remaining width W2 of the contour line (12) is greater than the remaining width W1 between the trenches 11, there is a possibility that an unoxidized portion 8 is formed in this portion. Therefore, as shown in FIG. 11B, the width W2 of the remaining area as the contour line (12) is set to the same as the remaining width W1 between the trenches 11, or is set to be thinner than this remaining width W1. Thus, it is possible to reduce an area in which the silicon layers 12, 14 are not oxidized.

Further, in FIGS. 5 and 6, the trench 9 formed outside (around the forming area of the block for light transmission) the lens forming area has a sufficiently wide width in comparison with the trench width within the block for light transmission. As shown in FIG. 8, the trench 9 formed around the forming area of the block for light transmission is set such that an air gap is left within the trench after the thermal oxidation is performed. Thus, buckling can be avoided. Further, an etching area (trench 9) is etched deeply in comparison with the trench 11 within a lens by a micro loading effect in the trench etching process. This shape is important in that a path of light is not obstructed in incidence and emission of light. Namely, a silicon oxide block (3) formed integrally with the silicon substrate 1 can avoid the obstruction of the path of light in the incidence and emission of light shown by L1 in FIG. 10 when a connecting portion 5 constructed by the silicon substrate of the same shape as the silicon oxide block (3) is arranged below this silicon oxide block (3).

Figure 12A:
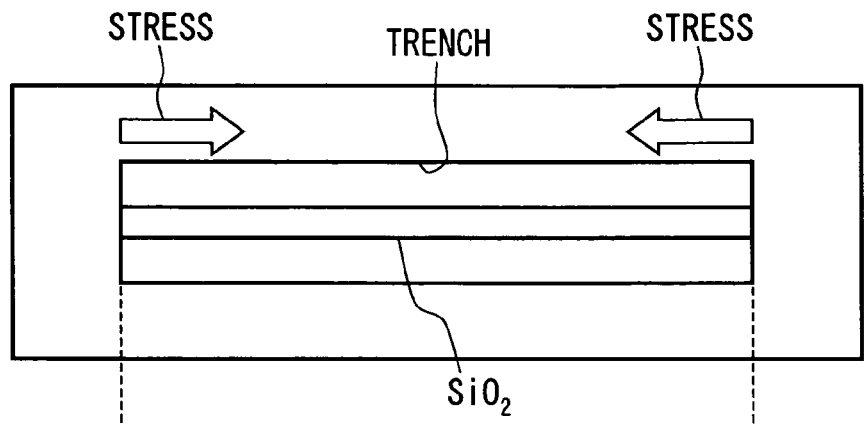
FIGS. 12A and 12B are plan views explaining deformation of a silicon oxide layer caused by thermal stress.
Figure 12B:
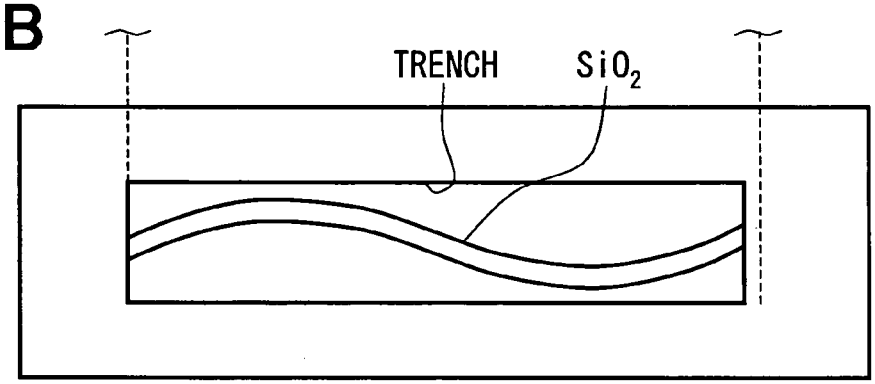
Figure 13A:
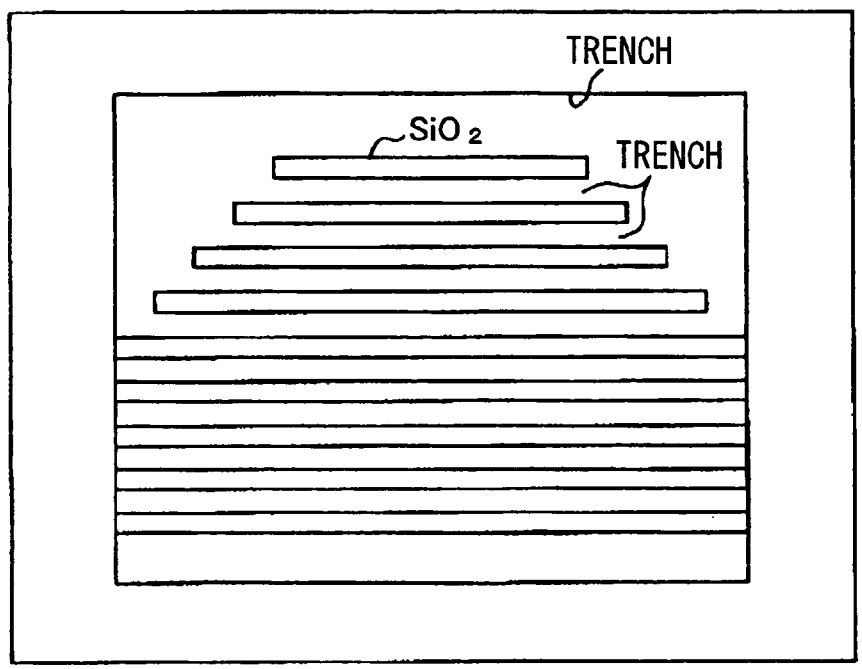
FIGS. 13A and 13B are plan views explaining deformation of silicon oxide layers caused by thermal stress.
Figure 13B:
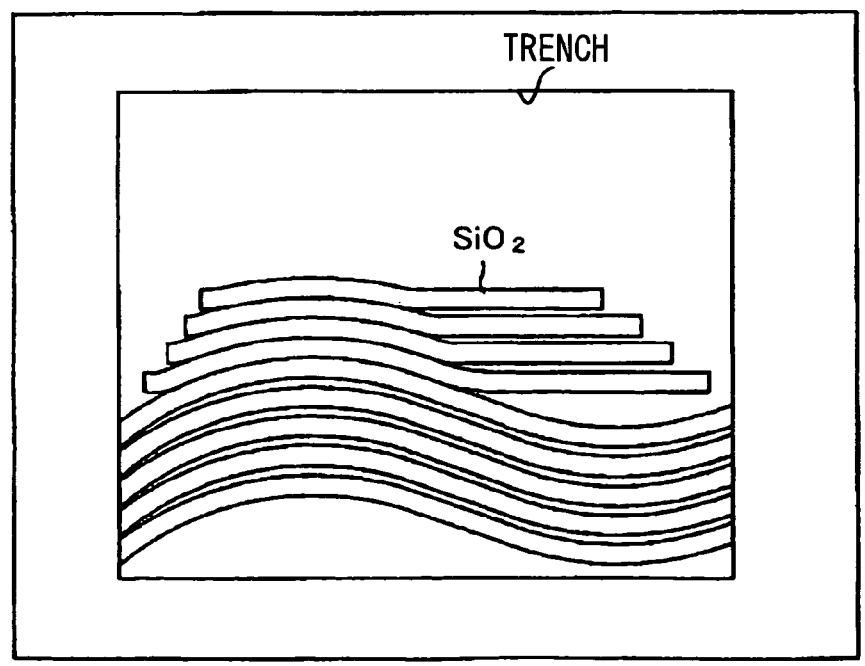

There is normally a difference in coefficient of thermal expansion due to heat between silicon and a silicon oxide ($SiO_2$) (Si: $2.6 \times 10^{-6}/°$ C., molten quartz: 0.4 to $0.55 \times 10^{-6}/°$ C. at 20° C., source: Rika-nenpyo (i.e., science chronological table)). Accordingly, as shown in FIGS. 12A and 12B as plan views for explaining deformation due to thermal stress, when the thermal oxidation is performed after silicon of a plate shape is simply left by the trench etching, stress is applied to the silicon oxide ($SiO_2$) of the plate shape from both sides by a difference of a contracting amount at a cooling time so that buckling is caused. Here, FIG. 12A represents a substrate having a trench and a $SiO_2$ layer at an annealing temperature such as 1000° C. FIG. 12B represents the substrate having a buckled $SiO_2$ layer at a room temperature after annealing. Therefore, even when many trenches 11 are arranged in one direction as shown in FIG. 13A as a plan view for explaining deformation due to thermal stress, there is a fear that an individual silicon oxide layer ($SiO_2$ layer) is buckled by the above reasons after the thermal oxidation as shown in FIG. 13B, and the lens shape as designed cannot be formed. Here, FIG. 13A represents a substrate before annealing, and FIG. 13B represents the substrate after annealing.

Therefore, in this embodiment mode, the following three measures are taken to form the micro lens.

As a first measure, the circumference of an area for forming the micro lens is surrounded by the trench (pulling area) 9. Namely, the trench 9 is formed around the forming area of the block for light transmission. As a second measure, an outer circumferential portion of the micro lens is surrounded by the remaining area (12) as a contour line. As a third measure, the extending direction of the trench 11 is set to be parallel to a transmitting direction of light. Namely, many trenches 11 arranged in parallel are extended in parallel with an optical axis.

The lens pattern is not pushed by the first measure from circumferential silicon at a temperature lowering time after the thermal oxidation. Thus, the silicon oxide ($SiO_2$) of the plate shape is not buckled. Further, the individual silicon oxide layer ($SiO_2$ layer) of the plate shape is dynamically connected by surrounding an outermost circumferential portion of the micro lens area by the remaining area (12) as a contour by the second measure, and buckling and falling can be prevented. Further, since a lens face can be prescribed by patterning of the remaining area (12) as a contour line, the lens face of an arbitrary curvature can be obtained in accordance with a pattern design. Further, an interface at which the individual silicon oxide layers ($SiO_2$ layers) of the plate shape are mutually adjacent can be set to be parallel to the transmitting direction of light by the third measure. Therefore, a reduction of transmittance (transmission of light) as a lens due to reflection, scattering, etc. of light in this portion can be restrained at its minimum.

The above forming process of the trench corresponds to a first process.

<Anneal Process>

Next, the entire substrate is anneal-processed within a hydrogen atmosphere, and surface roughness in a trench sidewall is reduced. The trench sidewall surface after the previous etching process, particularly, a flat property of the sidewall surface prescribing the outermost circumferential portion of the lens forming area is important since this face becomes an incident or emitting face of light. Thereafter, a lens face having a smooth surface can be obtained by performing the thermal oxidation. This technique is disclosed in JP-A-2002-231945, which corresponds to U.S. Pat. No. 6,630,389.

<Removal of Oxide Film Mask>

Next, as shown in FIG. 7, the oxide film mask 10 is removed by dipping into a fluoric acid solution, etc.

<Thermal Oxidation>

Next, as shown in FIG. 8, each silicon layer 13 is replaced with the silicon oxide layer 14 by performing the thermal oxidation. This thermal oxidation is performed such that no silicon oxide is buried between the respective silicon layers and the trench 11 narrowed in width is left. Further, the thermal oxidation is also performed such that an opening portion is left in the upper portion of the trench 11. Namely, it is set such that a super critical fluid can be flowed into the trench 11 in the next process.

<Burying of Trench>

Next, when the super critical fluid dissolving a predetermined compound such as organic compound thereinto is flowed into each trench 11, the predetermined compound dissolved into the super critical fluid on an inner wall face of each heated trench 11 is decomposed on this inner wall face, and the product decomposed from the super critical fluid is formed as a film on this inner wall face. Specifically, in this embodiment, the predetermined compound is TMOS (i.e., tetra-methoxysilane). The TMOS in the super critical fluid is resolved or chemically reacted so that the silicon oxide is formed on the inner wall face of the trench 11. When this film formation is advanced, each trench 11 is buried by the silicon oxide. As shown in FIG. 9, a burying layer 15 constructed from the silicon oxide buried by the super critical fluid is formed in the trench 11 between the silicon oxide layers 14. In this embodiment mode, since critical temperature and critical pressure are low, a critical state is easily attained and it is easily controlled. For such reasons, the super critical fluid of carbon dioxide as a main component is used.

The super critical fluid has the nature (diffusive property) of gas and the nature (dissolving property) of a liquid for dissolving-out a component, and also has characteristics able to continuously and greatly change its density. Therefore, each trench 11 can be buried by the silicon oxide without a clearance. Further, even when there are irregularities within the trench 11 and the opening portion of the upper portion is narrowed, the super critical fluid can be spread until all corners of the trench. Therefore, the trench 11 can be buried by the silicon oxide without any clearance.

Thus, the micro lens (block for light transmission) 3 integrated with the silicon substrate 1 is formed.

As shown in FIGS. 14A and 14B, if the upper portion of the trench is widely formed, there is no fear that the upper portion of the trench 11 is narrowed by the silicon oxide formed as a film in the trench 11. Therefore, there is no fear that a burying remainder is generated within the trench 11.

Finally, the circumference of the micro lens is dicing-cut at a predetermined size. Thus, a cylindrical lens is obtained as shown in FIG. 1. The burying process of the above trench corresponds to a second process.

The entire substrate may be also coated with a reflection preventing film for improving transmittance in accordance with necessity.

[Effect of First Embodiment Mode]

As mentioned above, in accordance with the manufacturing method of the optical element of the above first embodiment mode, carbon dioxide of the super critical state dissolving the TMOS thereinto is flowed into each trench 11 between the silicon oxide layers 14 arranged in parallel on the substrate face of the silicon substrate 1, and each trench 11 is formed as a film by the silicon oxide. Thus, it is possible to form the micro lens 3 of a state in which each trench 11 is buried by the silicon oxide without any clearance.

Accordingly, it is possible to manufacture the micro lens 3 having no fear that a diffraction phenomenon due to the remaining existing clearance is generated and efficiency is reduced.

Further, the super critical fluid has high density in comparison with a gaseous phase method represented by the CVD. Therefore, the silicon oxide can be dissolved at high density. Accordingly, a large amount of oxidized silicon can be supplied into each trench for a short time.

Accordingly, each trench can be buried by the oxidized silicon for a short time in comparison with the gaseous phase method.

Second Embodiment Mode

Next, a second embodiment mode will be explained with reference to FIGS. 15 to 18. This embodiment mode is characterized in that the circumference of the micro lens forming area is removed after the burying of each trench.

Figure 15:
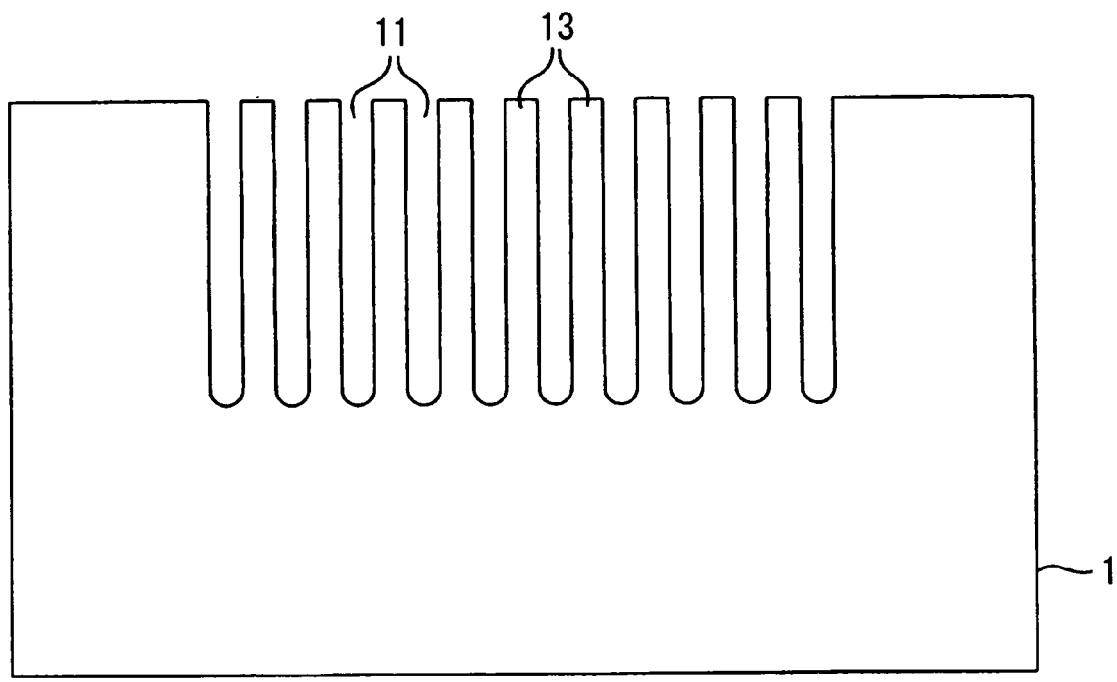
FIG. 15 is a cross sectional view showing a step of forming a trench in a method for manufacturing an optical device according to a second embodiment mode.
Figure 16:
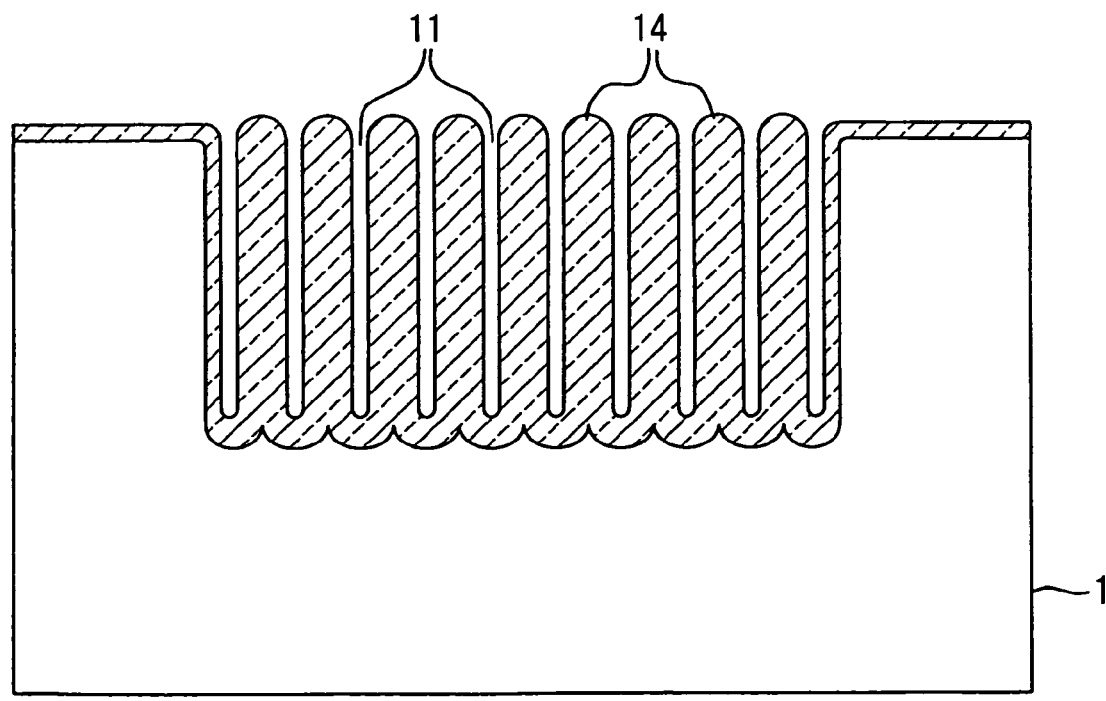
FIG. 16 is a cross sectional view showing a step of thermally oxidizing in the method for manufacturing the optical device according to the second embodiment mode.
Figure 17:
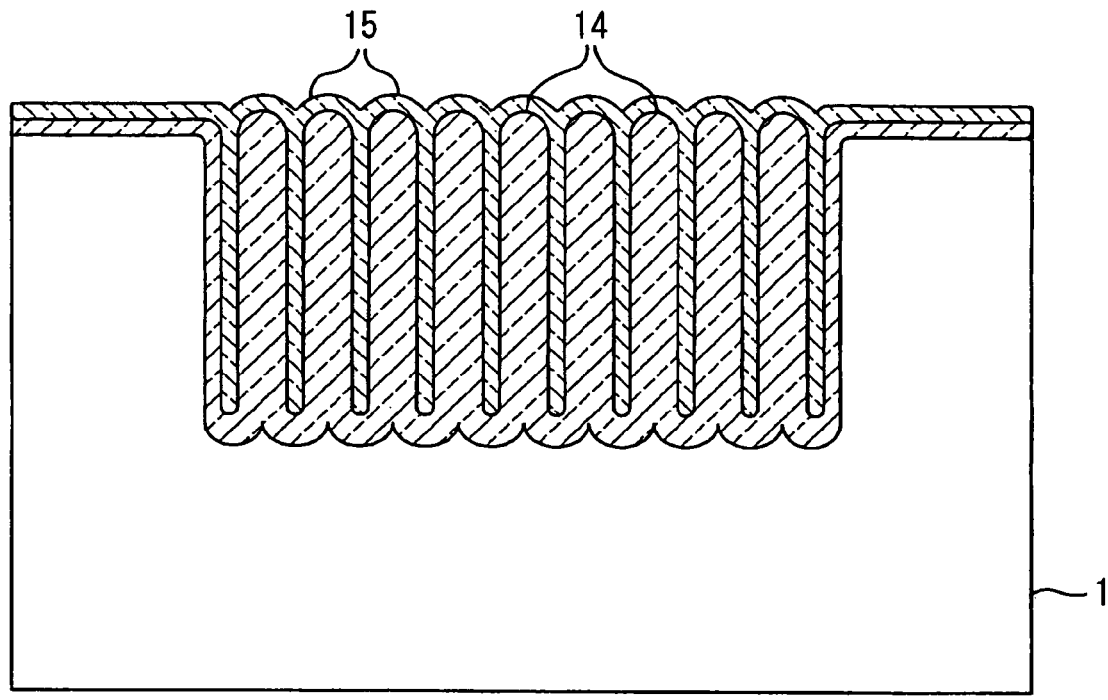
FIG. 17 is a cross sectional view showing a step of embedding the trench with silicon oxide in the method for manufacturing the optical device according to the second embodiment mode.
Figure 18:
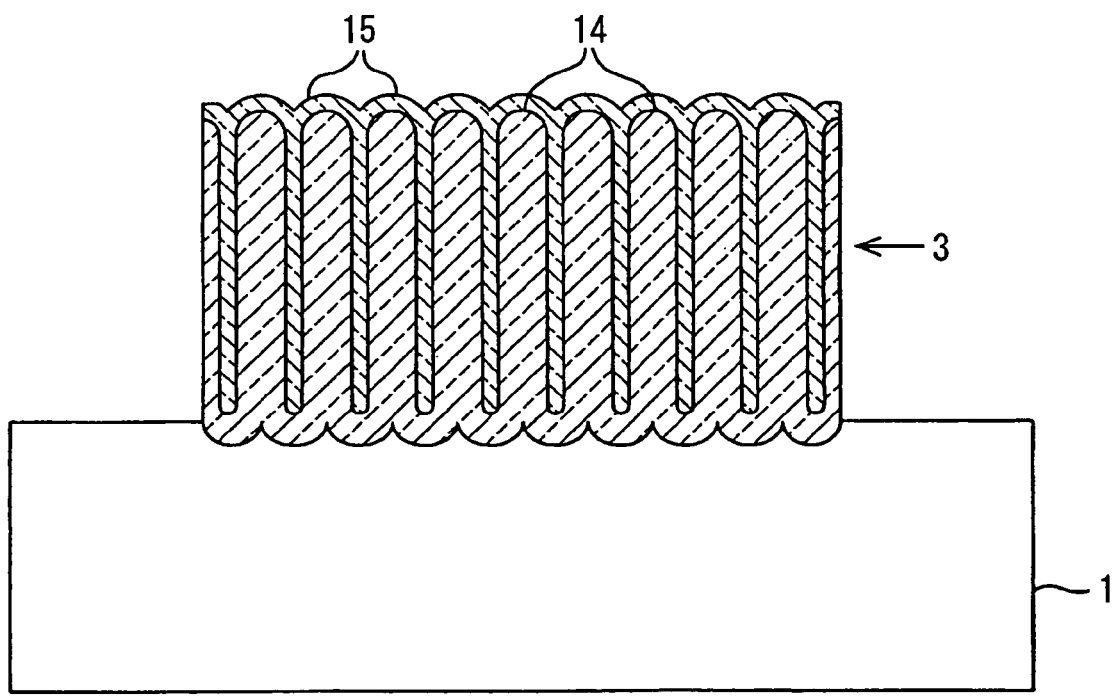
FIG. 18 is a cross sectional view showing a step of removing a periphery portion in the method for manufacturing the optical device according to the second embodiment mode.

FIG. 15 is a longitudinal sectional view of the silicon substrate forming the trench therein. FIG. 16 is a longitudinal sectional view showing a state in which the silicon substrate shown in FIG. 15 is thermally oxidized. FIG. 17 is a longitudinal sectional view showing a state in which each trench of the silicon substrate shown in FIG. 16 is buried by the silicon oxide. FIG. 18 is a longitudinal sectional view showing a state in which the circumference of the silicon oxide block shown in FIG. 17 is removed. Explanations of the same constructions and processes as the above first embodiment mode are omitted, and the same reference numerals are used with respect to the same constructions.

As shown in FIG. 15, this embodiment mode differs from the first embodiment mode in that no concave portion 2 shown in FIG. 6 is formed in the silicon substrate 1 removing the oxide film mask therefrom. As shown in FIG. 16, each silicon layer 13 is replaced with the silicon oxide layer 14 by taking heat treatment similar to that of the first embodiment mode. Next, similar to the first embodiment mode, carbon dioxide of the super critical state dissolving the TMOS thereinto is flowed into each trench 11, and each trench 11 is buried by the silicon oxide without any clearance.

Next, the upper face of the silicon oxide block is covered with an etching mask, and the circumference of the micro lens forming area is etched. The etching is stopped when the lower portion of an area removed by the etching has a depth equal to that of the silicon oxide block. Thus, as shown in FIG. 18, the micro lens 3 is formed on the substrate face of the silicon substrate 1.

In this embodiment mode, anisotropic etching is performed by using a potassium hydroxide (KOH) aqueous solution or a tetra methyl ammonium hydroxide (TMAH) aqueous solution. Further, since the plane azimuth of the silicon substrate 1 is a (110)-surface orientation, the etching can be performed perpendicularly to the substrate face by using the above aqueous solution. Accordingly, an outer circumferential face of the silicon oxide block (micro lens) can be accurately controlled in a target shape so as not to form a defect.

The removing process of the circumference of the above micro lens forming area corresponds to a third process.

[Effect of Second Embodiment Mode]

As mentioned above, in the manufacturing method of the optical element of the second embodiment mode, carbon dioxide of the super critical state dissolving the TMOS thereinto is also flowed into each trench 11 between the silicon oxide layers 14 arranged in parallel on the substrate face of the silicon substrate 1, and each trench 11 is also formed as a film by the silicon oxide. Thus, it is possible to form the micro lens 3 of a state in which each trench 11 is buried by the silicon oxide without any clearance.

Accordingly, it is possible to manufacture the micro lens 3 having no fear that a diffraction phenomenon due to the remaining existence of clearance is generated and efficiency is reduced.

Further, since the super critical fluid has high density in comparison with the gaseous phase method represented by the CVD, the silicon oxide can be dissolved at high concentration. Accordingly, a large amount of oxidized silicon can be supplied into each trench for a short time.

Accordingly, each trench can be buried by the oxidized silicon for a short time in comparison with the gaseous phase method.

Third Embodiment Mode

Next, a third embodiment mode of this invention will be explained with reference to FIGS. 19 to 21.

Figure 19A:
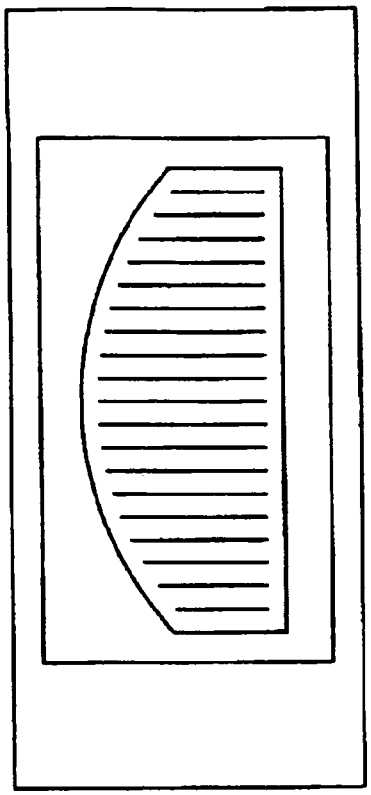
FIGS. 19A to 19C are plan views showing optical devices according to a third embodiment mode and modifications of the third embodiment.
Figure 19B:
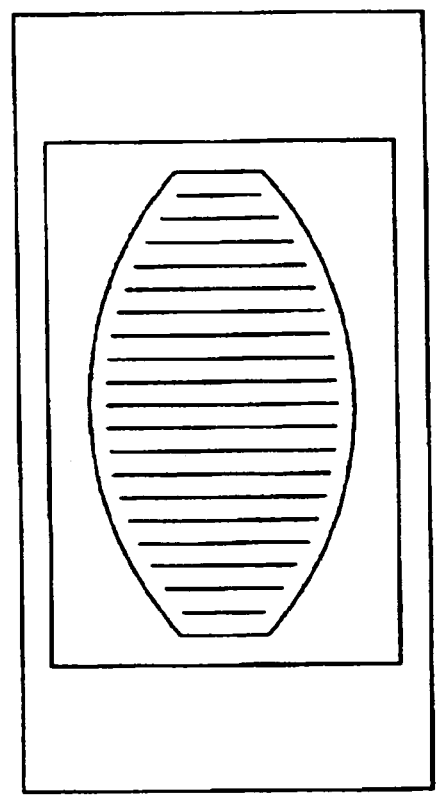
Figure 19C:
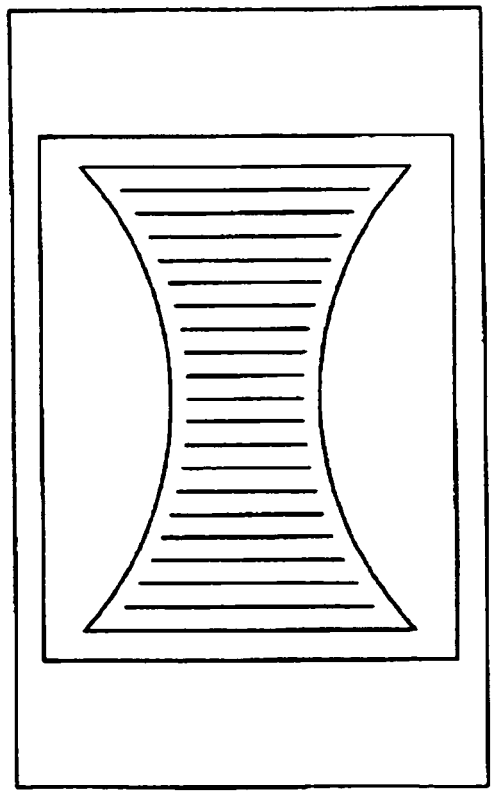
Figure 20A:
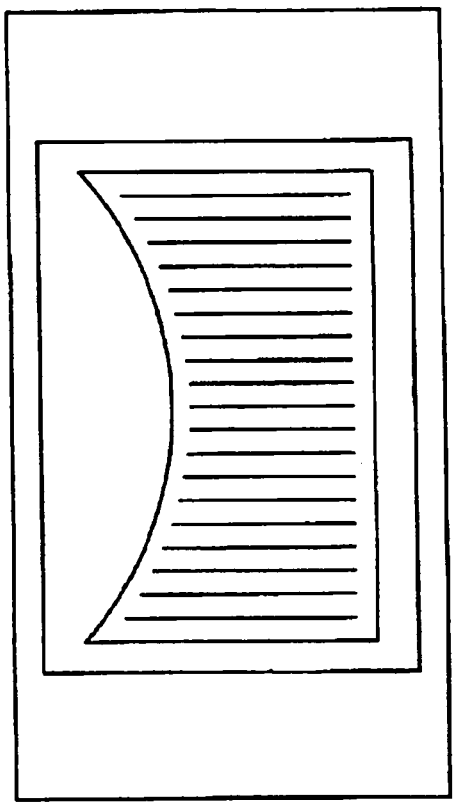
FIGS. 20A and 20B are plan views showing optical devices according to modifications of the third embodiment mode.
Figure 20B:
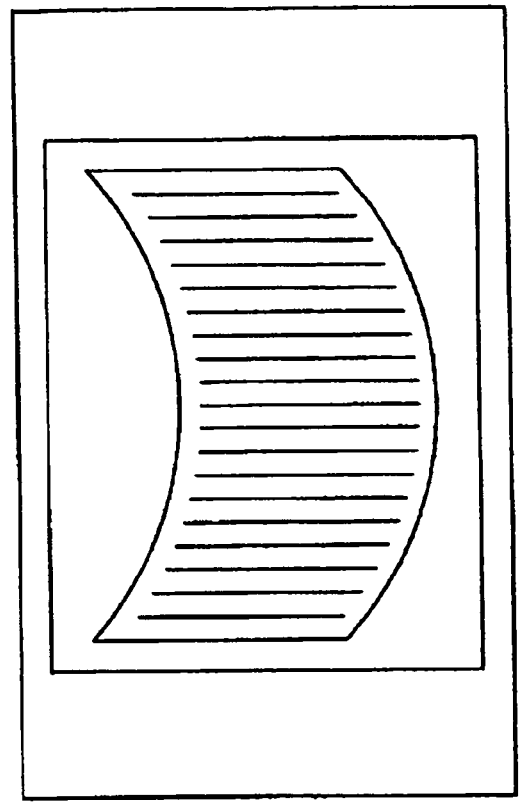
Figure 21A:
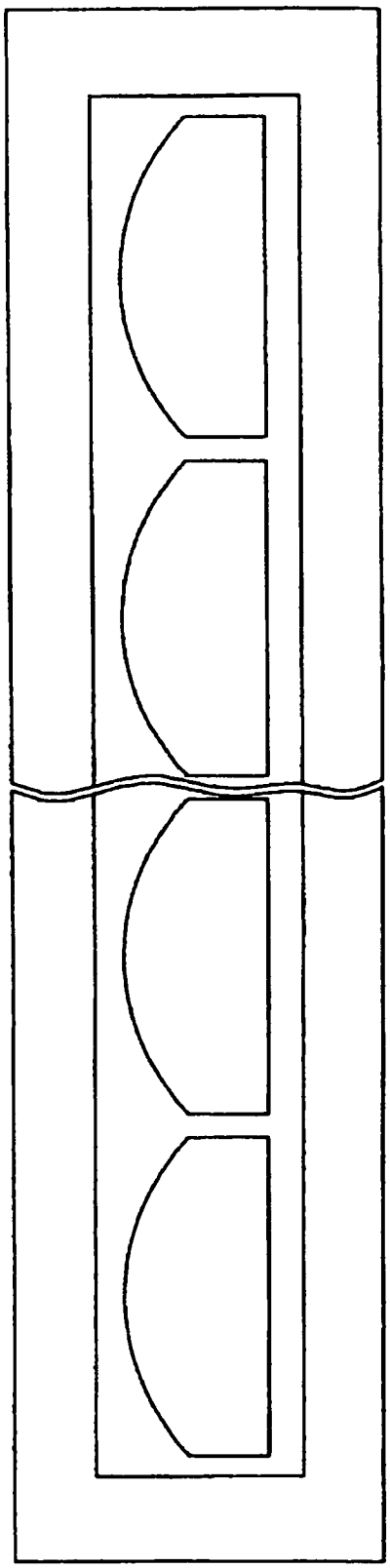
FIGS. 21A and 21B are plan views showing optical devices having multiple optical elements according to modifications of the third embodiment mode.
Figure 21B:
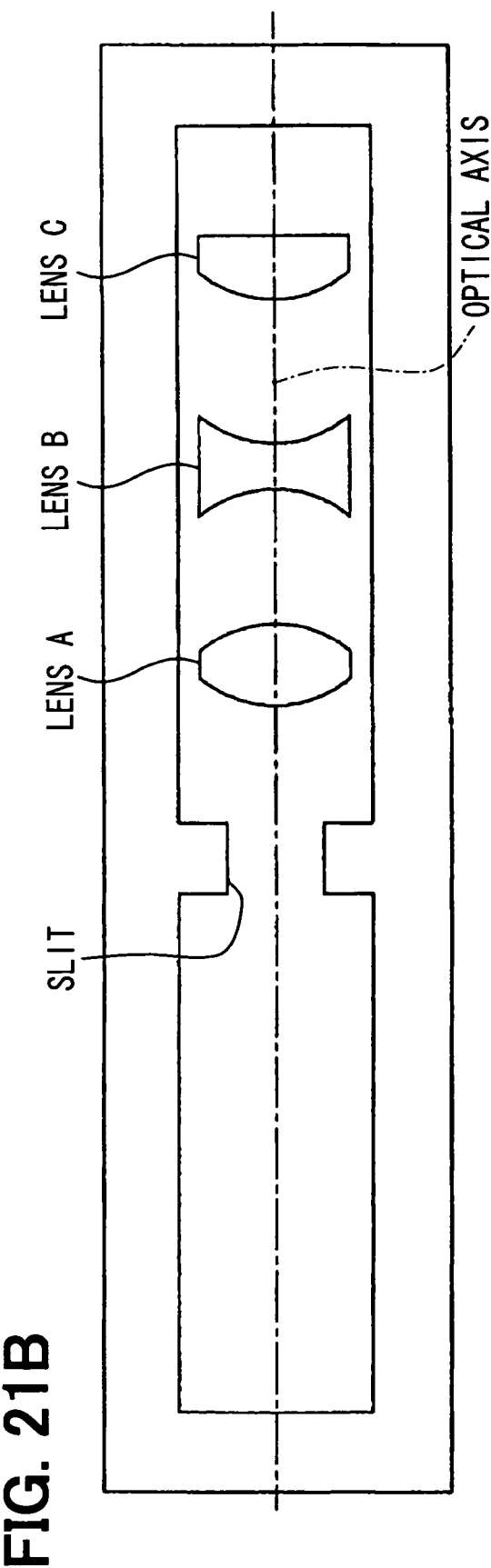

FIGS. 19A to 19C and FIGS. 20A and 20B are plan views showing modified examples of the optical element. FIGS. 21A and 21B are plan views of states in which plural optical elements are formed.

FIG. 19A illustrates a cylindrical lens of a flat convex type (i.e., a plano-convex lens) manufactured in the above first and second embodiment modes. However, in accordance with the design of a contour line, it is possible to form a lens of an arbitrary shape such as a biconvex lens as shown in FIG. 19B, a biconcave lens as shown in FIG. 19C, a flat concave lens (i.e., a plano-concave lens) as shown in FIG. 20A, a meniscus lens as shown in FIG. 20B, etc. Further, a lens of high NA (i.e., numerical aperture) can be also formed.

Further, if plural patterns are prepared, the lens can be collectively made. Therefore, for example, it is possible to form a lens array as shown in FIG. 21A, and lens groups of plural kinds arranged on the same optical axis as shown in FIG. 21B. Further, as shown in FIG. 21B, a slit, etc. can be also simultaneously made as well as the lens. Further, a prism can be also simultaneously made although this prism is not illustrated in the drawings.

Thus, the plural lenses (lens array), or the lens, the prism and the slit are patterned together, and these parts can be collectively made in the substrate via the trench etching, the thermal oxidizing process and the burying process of the trench using the super critical fluid. In this case, these parts can be formed by collectively performing the patterning from one mask to the substrate even in many lens arrays and a complicated optical system in which light passes through plural lenses. In particular, in the latter case, it is possible to dissolve the problem of optical axis alignment of an individual optical part as a very troublesome problem in a micro optical system. In a wide sense, no position alignment of the optical axis is required when it is intended to be collectively made in the silicon substrate via the trench etching, the thermal oxidizing process and the burying process of the trench using the super critical fluid by using a structure for forming plural optical parts including at least one of the lens, an optical waveguide path, the prism and the slit as a mask. Namely, no position alignment of the optical axis is required when the plural optical parts including at least one of the lens, the optical waveguide path and the slit are made in the silicon substrate as the structure of the optical element.

Fourth Embodiment Mode

Next, a fourth embodiment mode of this invention will be explained with a different point from the first embodiment mode as a center.

Figure 22:
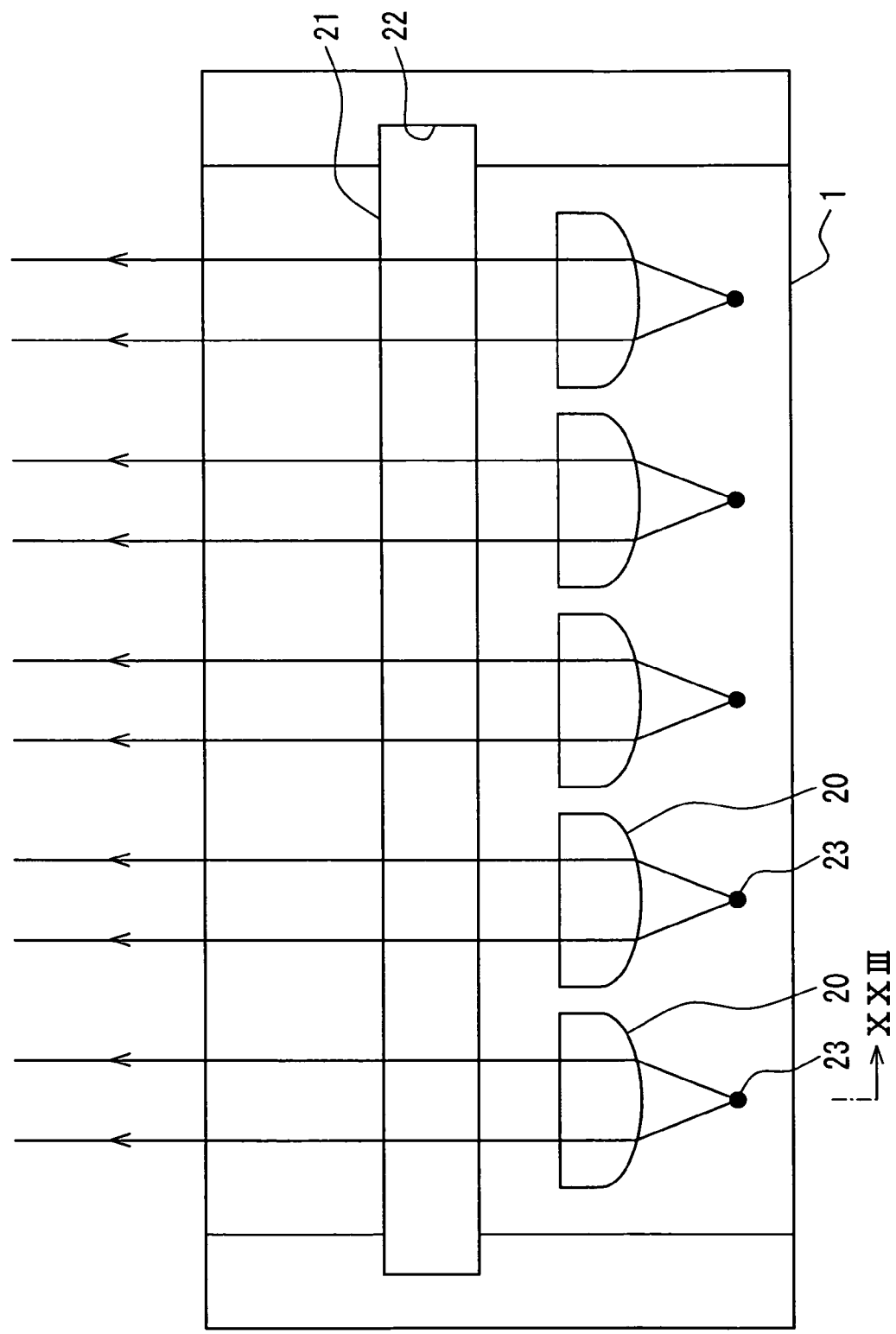
FIG. 22 is a plan view showing an optical device according to a fourth embodiment mode.
Figure 23:
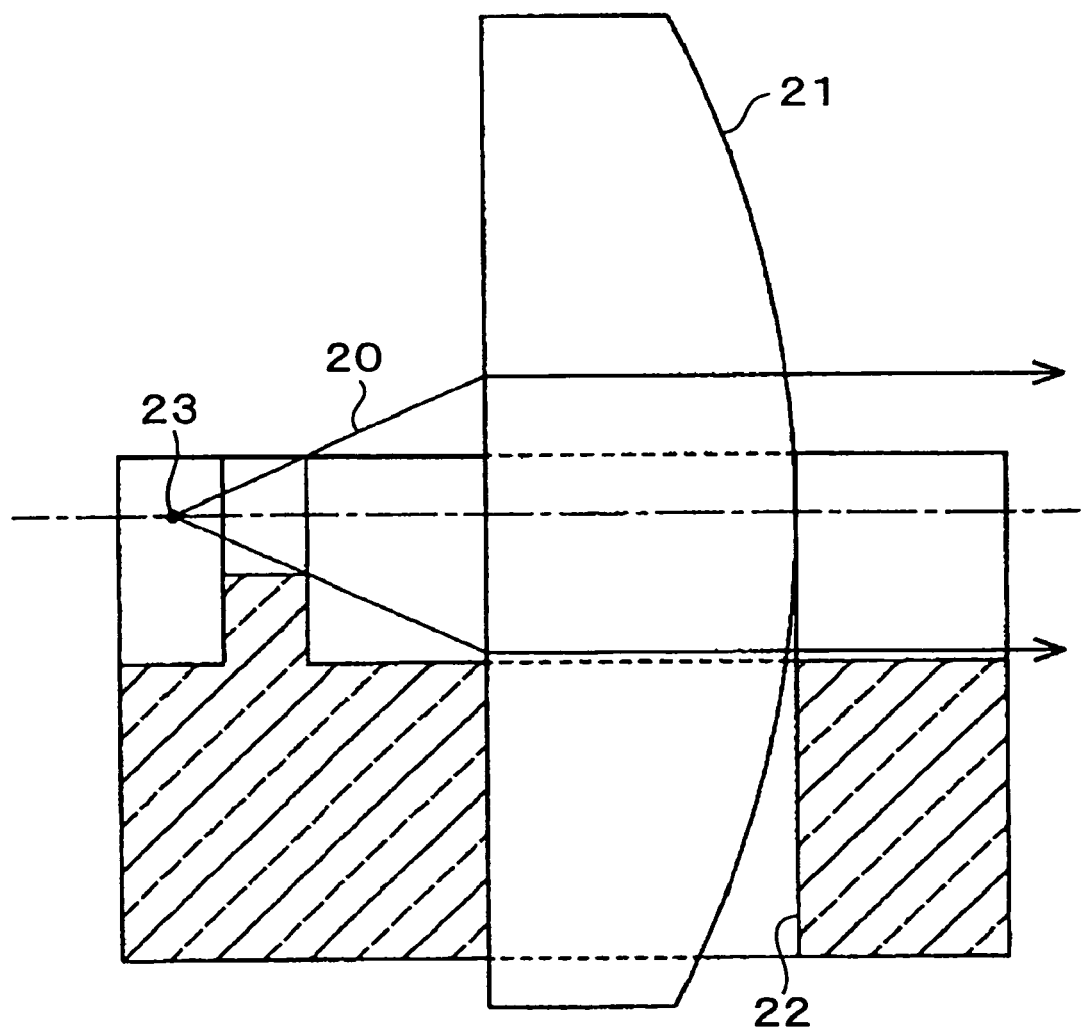
FIG. 23 is a cross sectional view showing the device taken along line XXIII-XXIII in FIG. 22.

FIG. 22 is a plan view of an optical element in this embodiment mode. FIG. 23 is a cross-sectional view seen from line XXIII-XXIII of FIG. 22.

In this embodiment mode, a cylindrical lens 21 of a structure separated from the silicon substrate 1 is fitted to the silicon substrate 1. This cylindrical lens 21 and a cylindrical lens as the optical element 20 are optically connected. The cylindrical lens 20 has a function for collimating or converging light in only the horizontal direction with respect to incident light, but the cylindrical lens 21 as a separate body is combined with this cylindrical lens 20. Thus, it is possible to collimate or converge light in the vertical direction.

The cylindrical lens 21 as a separate body is set by boring a hole 22 for assembly on the silicon substrate 1 side in advance by etching, etc., and fitting this cylindrical lens 21 into this hole 22. For example, a semiconductor laser 23 can be collimated by this optical system. In the semiconductor laser 23, widening angles of a beam in the horizontal direction and the vertical direction are normally greatly different. Therefore, it is necessary to combine two cylindrical lenses corresponding to the respective directions so as to collimate the semiconductor laser 23. In this case, such a construction is used. Namely, the cylindrical lens 20 is made in the silicon substrate 1, and the hole 22 is formed in the silicon substrate 1. The cylindrical lens 21 is fitted into this hole 22, and it is possible to set a construction for individually converging the light beam widened in the transversal and longitudinal directions by the pair of cylindrical lenses 20, 21 (the light beam can be also converged in the vertical direction). The example of the cylindrical lens is shown as a lens fitted to the silicon substrate 1, but a columnar shape lens, etc. may be also used.

Fifth Embodiment Mode

Figure 24:
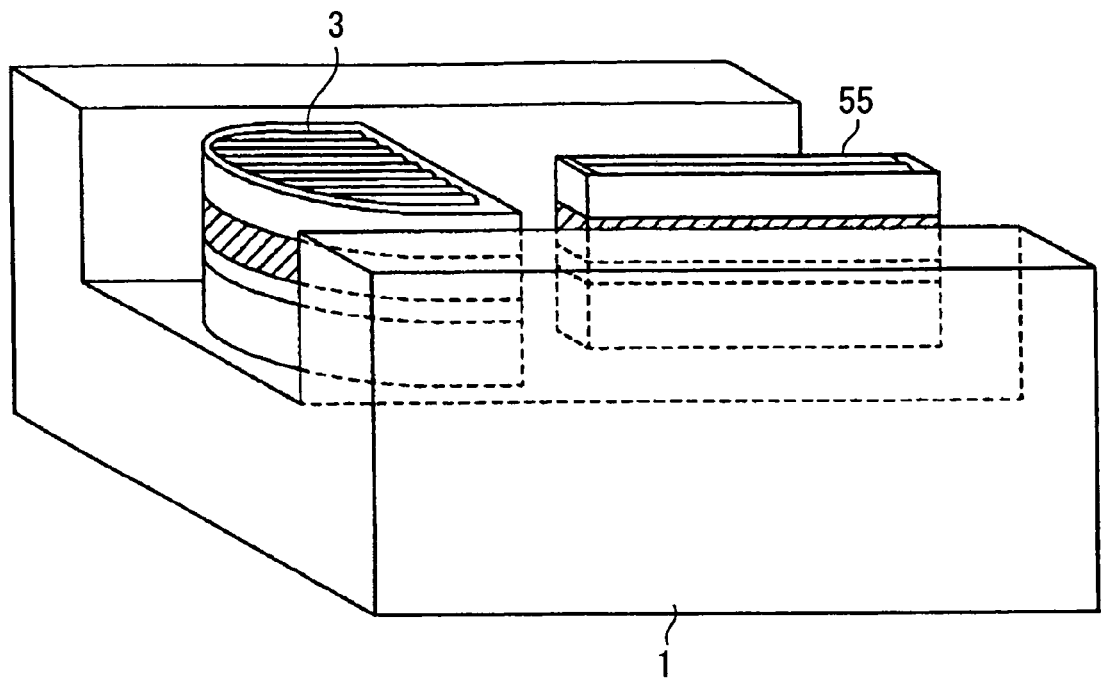
FIG. 24 is a perspective view showing an optical device according to a fourth embodiment mode.

Next, a fifth embodiment mode of this invention will be explained with a difference point from the first embodiment mode as a center. FIG. 24 is a perspective view of an optical element in this embodiment mode.

In this embodiment mode, an optical waveguide path 55 is formed together with a lens 3. The optical waveguide path 55 can be formed by the same method as the lens 3. Namely, if the number of trenches is small in a periodic trench structure and a pattern extremely long in the longitudinal direction is formed, a silicon oxide block of a line shape, i.e., the optical waveguide path 55 can be formed.

For example, the optical waveguide path 55 can be formed by executing D-RIE, a thermal oxidizing process, a burying process of the trench using a super critical fluid with respect to a pattern in which two silicon layers nipping the trench are arranged in the longitudinal direction. There is a difference of a refractive index in the vertical direction within the optical waveguide path 55, and light is confined near the center of a highest refractive index. Since the circumference of the optical waveguide path 55 is an open space in the transversal direction, light is confined within the optical waveguide path 55. This optical waveguide path 55 can be formed in an arbitrary shape in accordance with a pattern. Further, since the optical waveguide path 55 can be formed simultaneously with the lens 3, no position alignment in coupling to the lens 3 is required.

Further, the number of optical waveguide paths can be changed from one to a plural number and can be also reversely changed from a plural number to one in accordance with patterns. Therefore, it is possible to collectively form an optical system in which light is distributed and incident to plural lens arrays. A concrete example is shown in the perspective view of FIG. 25, and its plan view is shown in FIG. 26.

Figure 25:
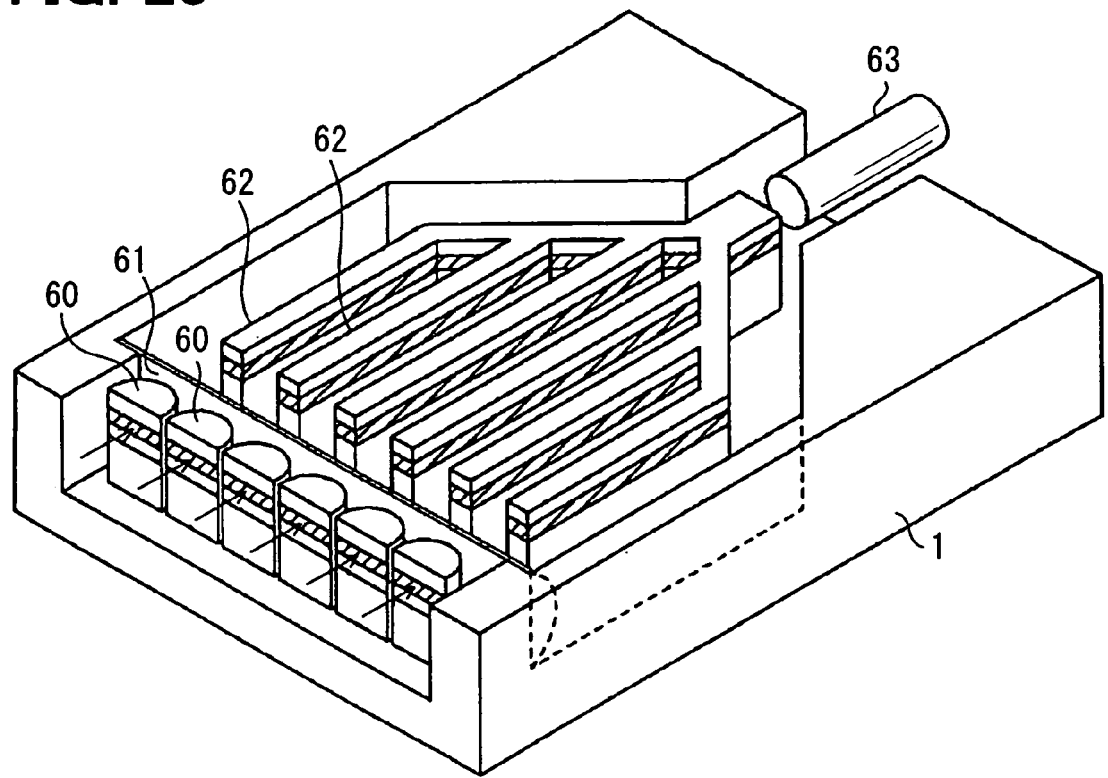
FIG. 25 is a perspective view showing an optical device according to a modification of the fourth embodiment mode.
Figure 26:
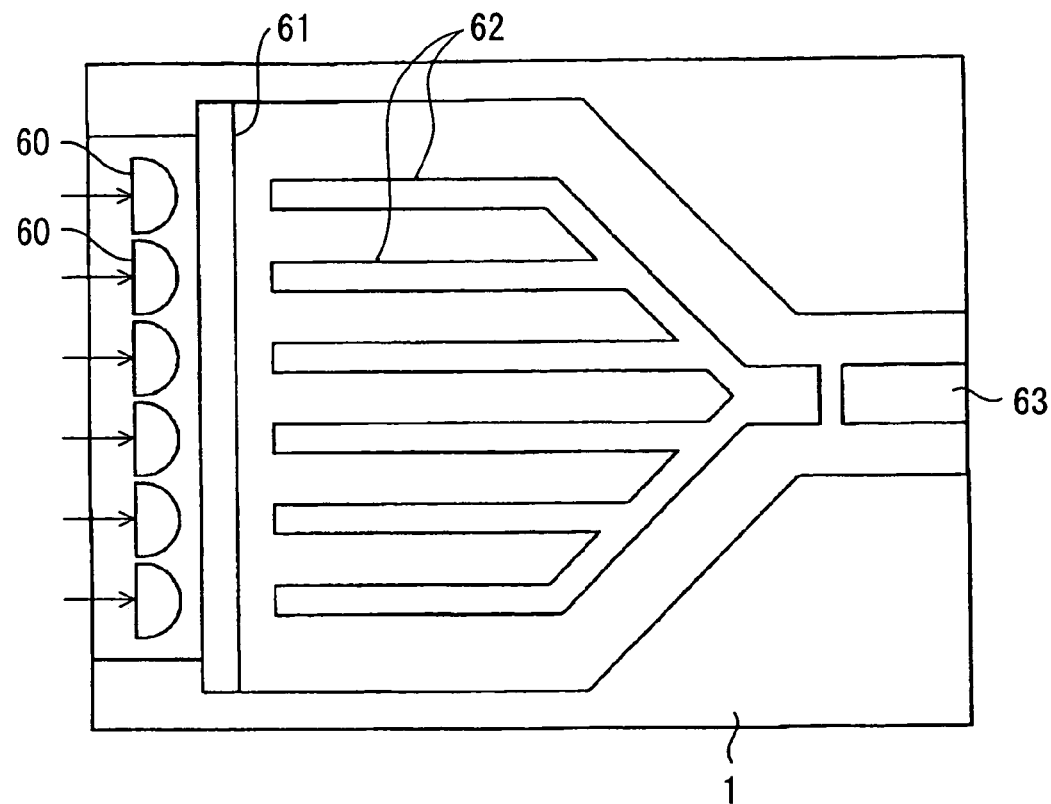
FIG. 26 is a plan view showing the optical device according to the modification of the fourth embodiment mode.
Figure 27:
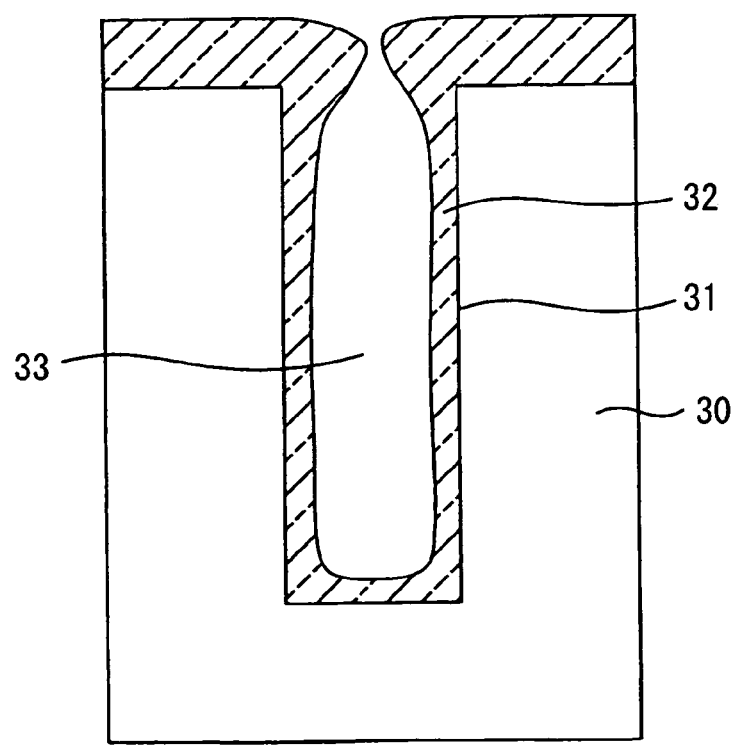
FIG. 27 is a cross sectional view showing a trench according to a related art.

In FIGS. 25 and 26, plural cylindrical lenses 60 for the horizontal direction are formed, and a cylindrical lens 61 for the vertical direction is arranged so as to be opposed to each of the cylindrical lenses 60 for the horizontal direction. Further, an optical waveguide path 62 is optically coupled to each cylindrical lens 60 for the horizontal direction. Further, the respective optical waveguide paths 62 are gathered as one path. An end face of an optical fiber 63 is arranged so as to be opposed to an end face of this gathered optical waveguide path 62. The cylindrical lens 61 for the vertical direction and the optical fiber 63 are fitted to a substrate 1. In this case, no position alignment is required with respect to the cylindrical lens 60 for the horizontal direction and the optical waveguide path 62. Further, the cylindrical lens 61 for the vertical direction and the optical fiber 63 are easily aligned in position in fitting to the substrate 1. Further, since it is a simple structure, a reduction in optical coupling efficiency is small. Further, it is excellent in mass production property, and cost can be reduced.

Thus, the silicon oxide block formed integrally with the silicon substrate may be an optical waveguide path and may be also a micro lens and the optical waveguide path.

Other Embodiment Modes

A chemical compound able to form a substance having a refractive index equal to that of a substance formed by the silicon oxide is dissolved into the super critical fluid so that each clearance can be also buried by the product formed from the chemical compound without any gap. For example, the refractive indexes of calcium fluoride, magnesium fluoride and alumina are respectively 0.13 to 8, 0.21 to 10 and 0.23 to 2, and are approximately equal to 1.2 to 8 in the refractive index of the silicon oxide.

The present disclosure has the following aspects.

According to a first aspect of the present disclosure, a method for manufacturing an optical device having an optical block, through which a light is transmitted, is provided. The method includes steps of: forming a plurality of silicon oxide members, which is disposed on a silicon substrate, wherein the silicon oxide members are arranged in parallel each other by a predetermined clearance between two adjacent silicon oxide members; and pouring a super critical fluid into the clearance so that the clearance is filled with a product formed from a predetermined compound for forming the optical block, wherein the predetermined compound is dissolved in the super critical fluid.

The super critical fluid has the nature of gas (diffusive property) and the nature of a liquid (dissolving property) for dissolving-out a component, and also has characteristics able to continuously greatly change its density.

Accordingly, the super critical fluid dissolving a predetermined chemical compound thereinto is flowed into each clearance between respective structural bodies constructed by a silicon oxide and arranged in parallel on the substrate face of the silicon substrate. A film is then formed within each clearance by the above product from the predetermined chemical compound. Thus, it is possible to form a block of a state in which each clearance is buried by the above product from the predetermined chemical compound without any gap.

Namely, it is possible to manufacture an optical element having no fear that a diffraction phenomenon due to the gap is generated and efficiency is reduced.

Further, since the super critical fluid has high density in comparison with the gaseous phase method represented by the CVD, a film forming material (the predetermined chemical compound) is dissolved at high concentration. Accordingly, a large amount of the film forming material can be supplied into each clearance for a short time.

Accordingly, each clearance can be buried by the product from the predetermined chemical compound for a short time in comparison with the gaseous phase method.

Alternatively, the predetermined compound may be resolved so that the product is formed. Alternatively, the predetermined compound may be chemically reacted so that the product is formed.

Alternatively, the step of forming the silicon oxide members may include a step of etching the silicon substrate by using a mask having a predetermined pattern.

If a technique for forming plural structural bodies by etching the silicon substrate by using a patterned mask is used, the shape and arrangement of each structural body can be changed by changing the mask pattern. Therefore, it is possible to realize an optical element of a high design free degree relating to the shape. For example, a lens of large NA and a lens shape of an aspherical face can be obtained.

Further, the step of forming the silicon oxide members may further include a step of oxidizing an etched silicon substrate so that the silicon oxide members are provided.

Alternatively, in the step of forming the silicon oxide members, each clearance between the silicon oxide members may have a width, which becomes narrower as it goes to a bottom of the clearance. In this case, the clearance between the respective structural bodies can be formed so as to be narrowed in width as it is deepened. Alternatively, in the step of forming the silicon oxide members, each clearance between the silicon oxide members may have two parts, one of which has a constant width, and the other one of which has a width that becomes wider as it goes to a top of the clearance, and the width of the top of the clearance is largest among the width of the clearance. In this case, the clearance can be formed so as to be gradually widened from an intermediate portion from a bottom portion toward an upper portion, and be widest in an uppermost portion. In the above cases, since the upper portion of the clearance is widely formed, there is no fear that the upper portion of the clearance is narrowed by the product from the chemical compound formed as a film in the clearance in performing burying processing of each clearance by the product from the chemical compound dissolved into the super critical fluid. Therefore, there is no fear that a burying remainder is generated within the clearance.

Alternatively, each silicon oxide member may have a thin plate shape extending in a longitudinal direction parallel to an optical axis of the optical block, and the thin plate shape has a sidewall extending in the longitudinal direction, the sidewall providing an inner wall of the clearance. In a first process, each structural body is formed in a thin plate shape such that a longitudinal side face extending in an optical axis direction becomes a wall face of the clearance. Therefore, an angle formed with respect to a passing direction of light can be set to an angle within a total reflection angle between the structural body and an air layer. Thus, it is possible to restrain that transmission of light due to scattering of light, etc. is reduced.

Alternatively, the step of forming the silicon oxide members may include steps of: forming a plurality of silicon members, which is disposed on the silicon substrate, wherein the silicon members are arranged in parallel each other by a predetermined clearance between two adjacent silicon members; and thermally oxidizing the silicon members so that the silicon oxide members are provided. In the step of thermally oxidizing the silicon members, the clearance remains between two neighboring silicon members without being filled with a silicon oxide. In the first process, plural structural bodies constructed by the silicon oxide are formed by thermally oxidizing the plural structural bodies constructed by silicon such that no clearance is buried by the silicon oxide. Therefore, a block of a state in which each clearance is buried without any gap by a substance having at least a product from a predetermined chemical compound can be formed by flowing the super critical fluid into the clearance left between the respective structural bodies.

Alternatively, each silicon member may have a width, and each clearance may have a width. The width of the silicon member and the width of the clearance are determined in such a manner that the clearance remains between two neighboring silicon members in the step of thermally oxidizing the silicon members. In the first process, the width of each structural body constructed by silicon and the width of each clearance are set such that no clearance is buried by the silicon oxide by the thermal oxidation. Therefore, there is no fear that a narrow portion of an opening portion, a blocking portion, etc. are formed within the clearance and the super critical fluid cannot be sufficiently flowed into the clearance and cannot be flowed into the clearance by incompletely burying the clearance by the silicon oxide.

Alternatively, the product from the compound may be made of silicon oxide. It is possible to form a block in which each clearance is buried by the silicon oxide without any gap by flowing the super critical fluid dissolving the TMOS thereinto into the clearance between the respective structural bodies. Accordingly, since the block entirely formed by the silicon oxide can be obtained, an optical element having a refractive index equal to that of the silicon oxide can be realized.

Alternatively, the product from the compound may have a refraction index, which is substantially equal to a refraction index of silicon oxide. A chemical compound (e.g., calcium fluoride, magnesium fluoride, alumina, etc.) able to form a substance having a refractive index equal to that of a substance formed by the silicon oxide is dissolved into the super critical fluid so that each clearance can be also buried by this product from the chemical compound without any gap.

Alternatively, the silicon substrate may have a surface with a (110)-surface orientation. Since the plane azimuth of the substrate face is the (110)-surface orientation, it is possible to vertically etch a wall face (a side face of each structural body) of each clearance by its anisotropic property.

Alternatively, the step of forming the silicon oxide members may include a step of etching the silicon substrate by a reactive ion etching method so that a trench is formed as the clearance. In this case, each clearance can be formed in a trench shape by performing reactive ion etching of the silicon substrate. For example, while an etching step for etching the silicon substrate by plasma of an etching property gas and a protecting film forming step for forming a sidewall protecting film within the trench by plasma of a depositing property gas are switched, the trench of a high aspect ratio can be formed by alternately repeating these steps. In a method for depositing a silicon oxide layer by the CVD, the thickness of a lens layer is limited to about 10 µm since it is deposition. However, it is possible to form the lens layer of 100 µm or more in thickness by the trench etching method of the high aspect ratio. Thus, a practical and more three-dimensional lens, e.g., a cylindrical lens can be formed as the lens.

Alternatively, the super critical fluid may include a main component of carbon dioxide. For example, carbon dioxide is low in critical temperature and critical pressure in comparison with water, and easily attains a critical state and has a nature easily controlled. Accordingly, the super critical fluid of carbon dioxide in a main component is used.

Alternatively, the optical block may be a micro lens. Or, the optical block may be an optical waveguide. Or, the optical block may be a prism. Alternatively, the optical block may include at least one of a plurality of micro lenses, a plurality of optical waveguides and a plurality of prisms. Or, the optical block may include at least two of a micro lens, an optical waveguide and a prism. Or, the optical block may include at least two of a plurality of micro lenses, a plurality of optical waveguides and a plurality of prisms. In the above cases, it is possible to manufacture a micro lens, an optical waveguide path or a prism in which no clearance is left between the respective structural bodies and no efficiency is reduced by a diffraction phenomenon. Further, one of the micro lens, the optical waveguide path and the prism can be simultaneously manufactured in plurality. Otherwise, at least two of the micro lens, the optical waveguide path and the prism can be respectively simultaneously manufactured every plurality. When plural optical elements are simultaneously formed as in these cases, no optical alignment after element formation is required by making the optical elements in the silicon substrate so as to conform the optical axis of each block of each optical element.

According to a second aspect of the present disclosure, a method for manufacturing an optical device having an optical block, through which a light is transmitted, is provided. The method includes steps of: forming a plurality of silicon oxide members, which is disposed in a silicon substrate, wherein the silicon oxide members are arranged in parallel each other by a predetermined clearance between two adjacent silicon oxide members; pouring a super critical fluid into the clearance so that the clearance is filled with a product formed from a predetermined compound, wherein the predetermined compound is dissolved in the super critical fluid; and removing a periphery portion of the silicon substrate disposed around the silicon oxide members with the compound filled in the clearance so that the optical block is formed.

The super critical fluid has the nature of gas (diffusive property) and the nature of a liquid (dissolving property) for dissolving-out a component, and also has characteristics able to continuously greatly change its density.

Accordingly, the super critical fluid dissolving a predetermined chemical compound thereinto is flowed into each clearance between respective structural bodies constructed by a silicon oxide and arranged in parallel within the silicon substrate. A film is then formed within each clearance by the above product formed from the predetermined chemical compound. Thus, each clearance can be buried by the above product from the predetermined chemical compound without any gap. It is then possible to form a block of a state in which each clearance is buried by the above product from the predetermined chemical compound without any gap by removing a circumferential portion of a portion constructed by each structural body.

Namely, it is possible to manufacture an optical element having no fear that a diffraction phenomenon due to the gap is generated and efficiency is reduced.

Further, since the super critical fluid has high density in comparison with the gaseous phase method represented by the CVD, a film forming material (the predetermined chemical compound) is dissolved at high concentration. Accordingly, a large amount of the film forming material can be supplied into each clearance for a short time.

Accordingly, each clearance can be buried by the product from the predetermined chemical compound for a short time in comparison with the gaseous phase method.

Alternatively, in the step of removing the periphery portion, the periphery portion may be removed from a surface of the silicon substrate until a depth of a removed periphery portion from the surface of the silicon substrate is substantially equal to a depth of the silicon oxide member. In this case, in a third process, processing for removing a circumferential portion of a portion constructed by each structural body is performed from the substrate face of the silicon substrate. When the lower portion of a removed area has a depth equal to that of each structural body, the above processing is stopped. Thus, a block having a height equal to the depth of each structural body can be formed on the substrate face of the silicon substrate.

Alternatively, the step of removing the periphery portion may be an etching process of the periphery portion. In this case, the circumferential portion of the portion constructed by each structural body can be removed by etching.

Alternatively, the etching process may be an anisotropic etching process. In this case, the circumferential portion of the portion constructed by each structural body can be removed by anisotropic etching. Namely, in isotropic etching, processing is also advanced in the transversal direction. Therefore, no shape of the circumferential portion except for a block can be processed as designed. However, the etching is advanced only in a substrate perpendicular direction by using the anisotropic etching. Therefore, an outer circumferential face of the block can be accurately set to a target shape.

Alternatively, the anisotropic etching process may be performed by using a KOH solution or a TMAH solution. In this case, the anisotropic etching can be cheaply and easily performed if a potassium hydroxide (KOH) aqueous solution or a tetra methyl ammonium (TMAH) hydroxide aqueous solution is used.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for manufacturing an optical device having an optical block, through which a light is transmitted, the method comprising steps of:
   forming a plurality of silicon oxide members, which is disposed on a silicon substrate, wherein the silicon oxide members are arranged in parallel each other by a predetermined clearance between two adjacent silicon oxide members; and
   pouring a super critical fluid into the clearance so that the clearance is filled with a product formed from a predetermined compound for forming the optical block, wherein the predetermined compound is dissolved in the super critical fluid.

2. The method according to claim 1, wherein the predetermined compound is resolved so that the product is formed.

3. The method according to claim 1, wherein the predetermined compound is chemically reacted so that the product is formed.

4. The method according to claim 1, wherein the step of forming the silicon oxide members includes a step of etching the silicon substrate by using a mask having a predetermined pattern.

5. The method according to claim 4, wherein the step of forming the silicon oxide members further includes a step of oxidizing an etched silicon substrate so that the silicon oxide members are provided.

6. The method according to claim 1, wherein in the step of forming the silicon oxide members, each clearance between the silicon oxide members has a width, which becomes narrower as it goes to a bottom of the clearance.

7. The method according to claim 1, wherein in the step of forming the silicon oxide members, each clearance between the silicon oxide members has two parts, one of which has a constant width, and the other one of which has a width that becomes wider as it goes to a top of the clearance, and the width of the top of the clearance is largest among the width of the clearance.

8. The method according to claim 1, wherein each silicon oxide member has a thin plate shape extending in a longitudinal direction parallel to an optical axis of the optical block, and
the thin plate shape has a sidewall extending in the longitudinal direction, the sidewall providing an inner wall of the clearance.

9. The method according to claim 1, wherein the step of forming the silicon oxide members includes steps of:
   forming a plurality of silicon members, which is disposed on the silicon substrate, wherein the silicon members are arranged in parallel each other by a predetermined clearance between two adjacent silicon members; and
   thermally oxidizing the silicon members so that the silicon oxide members are provided, and
in the step of thermally oxidizing the silicon members, the clearance remains between two neighboring silicon members without being filled with a silicon oxide layer.

10. The method according to claim 9, wherein each silicon member has a width,
each clearance has a width, and
the width of the silicon member and the width of the clearance are determined in such a manner that the clearance remains between two neighboring silicon members in the step of thermally oxidizing the silicon members.

11. The method according to claim 1, wherein the product formed from the compound is made of silicon oxide.

12. The method according to claim 1, wherein the product formed from the compound has a refraction index, which is substantially equal to a refraction index of silicon oxide.

13. The method according to claim 1, wherein the silicon substrate has a surface with a (110)-surface orientation.

14. The method according to claim 1, wherein the step of forming the silicon oxide members includes a step of etching the silicon substrate by a reactive ion etching method so that a trench is formed as the clearance.

15. The method according to claim 1, wherein the super critical fluid includes a main component of carbon dioxide.

16. The method according to claim 1, wherein the optical block is a micro lens.

* * * * *